(12) United States Patent
Wages

(10) Patent No.: US 11,446,809 B2
(45) Date of Patent: Sep. 20, 2022

(54) HOLDER FOR A BATTERY-POWERED TOOL

(71) Applicant: Kenneth M. Wages, Eugene, OR (US)

(72) Inventor: Kenneth M. Wages, Eugene, OR (US)

( * ) Notice: Subject to any disclaimer, the term of this patent is extended or adjusted under 35 U.S.C. 154(b) by 279 days.

(21) Appl. No.: 16/986,235

(22) Filed: Aug. 5, 2020

(65) Prior Publication Data

US 2021/0078158 A1 Mar. 18, 2021

(51) Int. Cl.

| B25H 3/00 | (2006.01) |
|---|---|
| A45F 5/02 | (2006.01) |
| F16M 13/04 | (2006.01) |
| A45F 3/14 | (2006.01) |
| F16M 13/02 | (2006.01) |
| F16B 1/00 | (2006.01) |

(52) U.S. Cl.
CPC .............. *B25H 3/006* (2013.01); *A45F 3/14* (2013.01); *A45F 5/021* (2013.01); *B25H 3/003* (2013.01); *F16M 13/02* (2013.01); *F16M 13/04* (2013.01); *A45F 2003/142* (2013.01); *A45F 2200/0575* (2013.01); *F16B 2001/0035* (2013.01)

(58) Field of Classification Search
CPC . B25H 3/006; B25H 3/003; A45F 3/14; A45F 5/021; A45F 2003/142; A45F 2200/0575; F16M 13/02; F16M 13/04; F16B 2001/0035
See application file for complete search history.

(56) References Cited

U.S. PATENT DOCUMENTS

| 4,917,281 | A | * | 4/1990 | Ostermiller | ............ | B25H 3/006 |
| | | | | | | D3/228 |
| 5,450,993 | A | * | 9/1995 | Guerrero | .................... | A45F 5/02 |
| | | | | | | 224/242 |
| 5,984,046 | A | * | 11/1999 | Urso, Jr. | .................... | A45F 5/14 |
| | | | | | | 224/904 |
| 6,065,658 | A | * | 5/2000 | Hashimoto | ............... | A45F 3/14 |
| | | | | | | 224/904 |
| 6,325,577 | B1 | * | 12/2001 | Anderson | ............... | A45F 5/021 |
| | | | | | | 224/904 |
| D455,901 | S | * | 4/2002 | Snider | ....................... | A45F 5/14 |
| | | | | | | D3/228 |
| 6,892,914 | B2 | * | 5/2005 | Girbert | ....................... | A45F 3/14 |
| | | | | | | 224/663 |
| 9,427,069 | B1 | * | 8/2016 | Carver | ....................... | A45F 5/02 |
| 2002/0003155 | A1 | * | 1/2002 | Holland | .................... | A45F 5/02 |
| | | | | | | 224/904 |

(Continued)

Primary Examiner — Anita M King
(74) Attorney, Agent, or Firm — David S. Alavi

(57) ABSTRACT

A tool holder includes a body and mounting hardware, and holds a battery-powered tool. The body includes central and lateral panels that partly enclose and retain the battery of the tool. The mounting hardware is attached to a lateral panel and attaches the tool holder to a separate object or structure. The lateral panels have inwardly extending portions at their edges that support the enclosed battery and obstruct its movement away from the central panel and out of the body. The inwardly extending portions are spaced apart at a first end of the body, enabling insertion of the battery into the body with a handle portion of the tool extending away from the central panel. The tool holder retains and supports the tool with the battery retained within the body and without any other direct contact between the tool and the tool holder.

26 Claims, 17 Drawing Sheets

(56) References Cited

U.S. PATENT DOCUMENTS

| | | | |
|---|---|---|---|
| 2006/0266782 A1* | 11/2006 | Godshaw | B25H 3/006 |
| | | | 224/904 |
| 2008/0073393 A1* | 3/2008 | Soderquist | F41C 33/0227 |
| | | | 224/250 |
| 2012/0145755 A1* | 6/2012 | Kahn | A45F 5/021 |
| | | | 224/183 |
| 2015/0238002 A1* | 8/2015 | Kinskey | A45F 5/021 |
| | | | 224/681 |

* cited by examiner

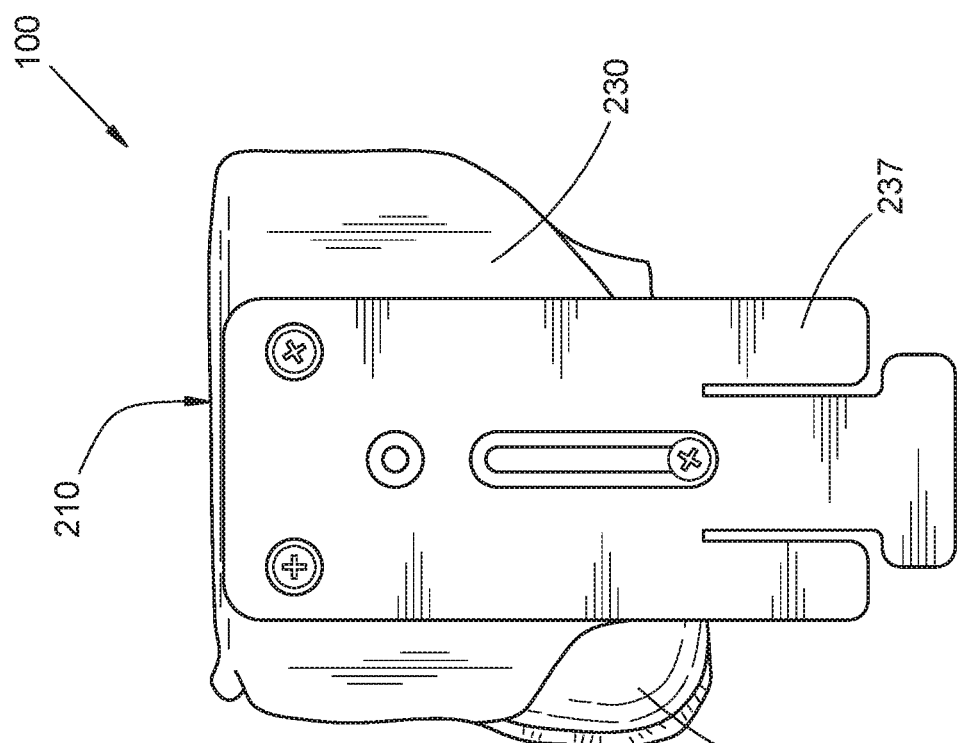
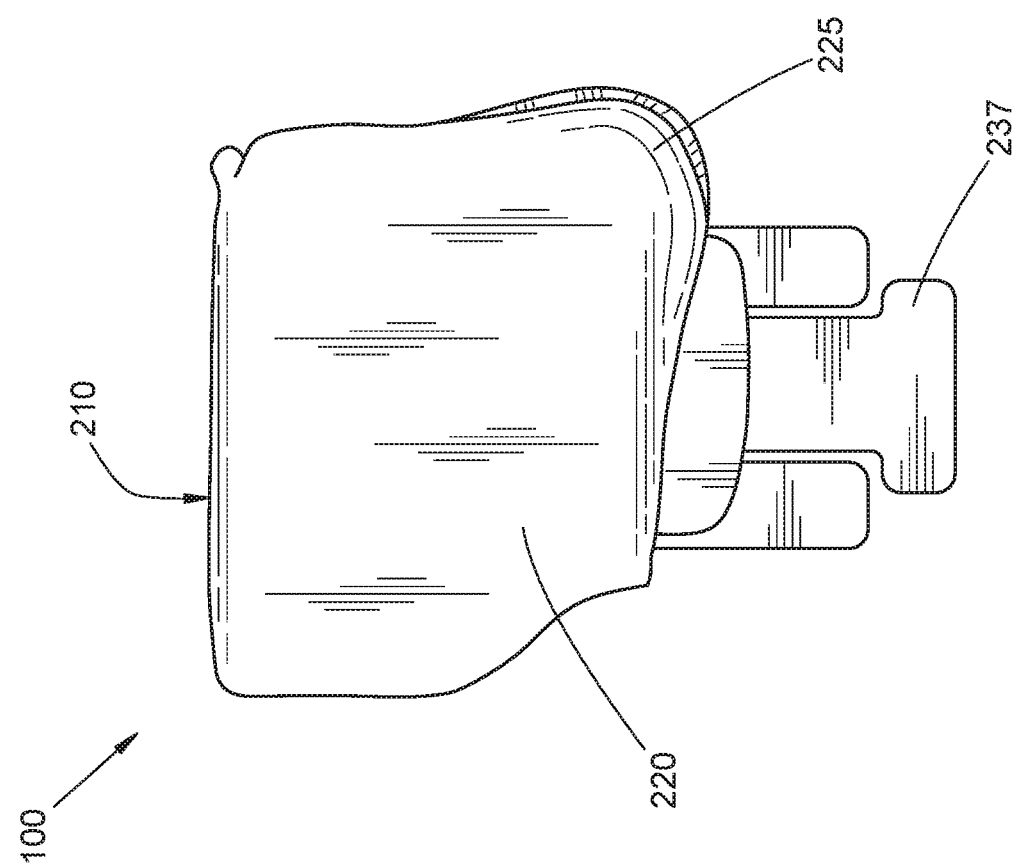
FIG. 1A
FIG. 1B

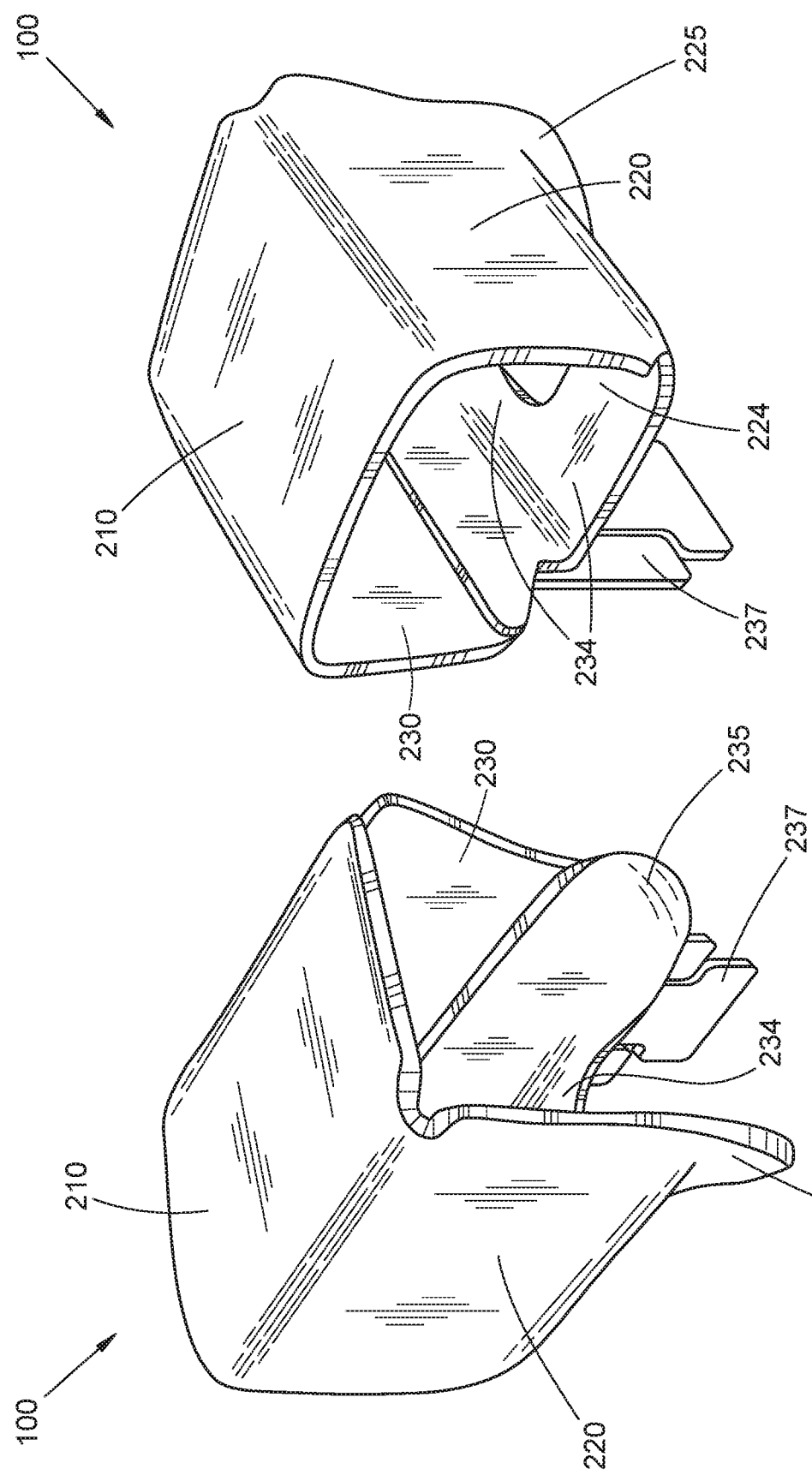

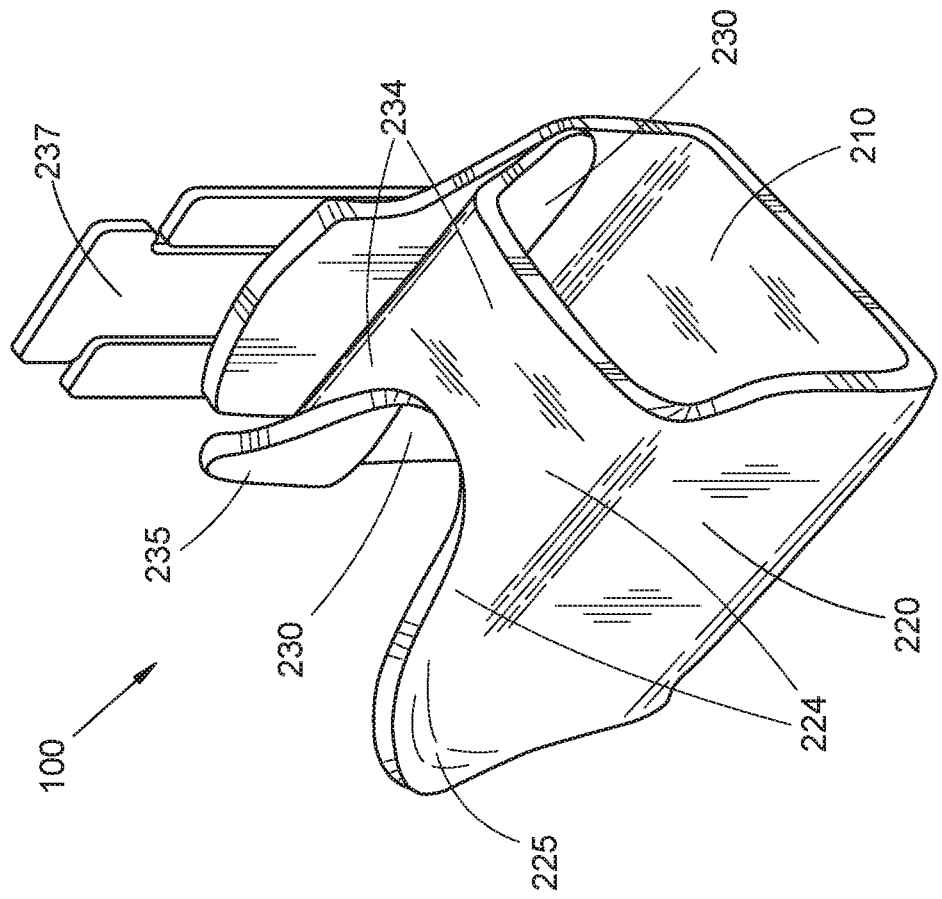
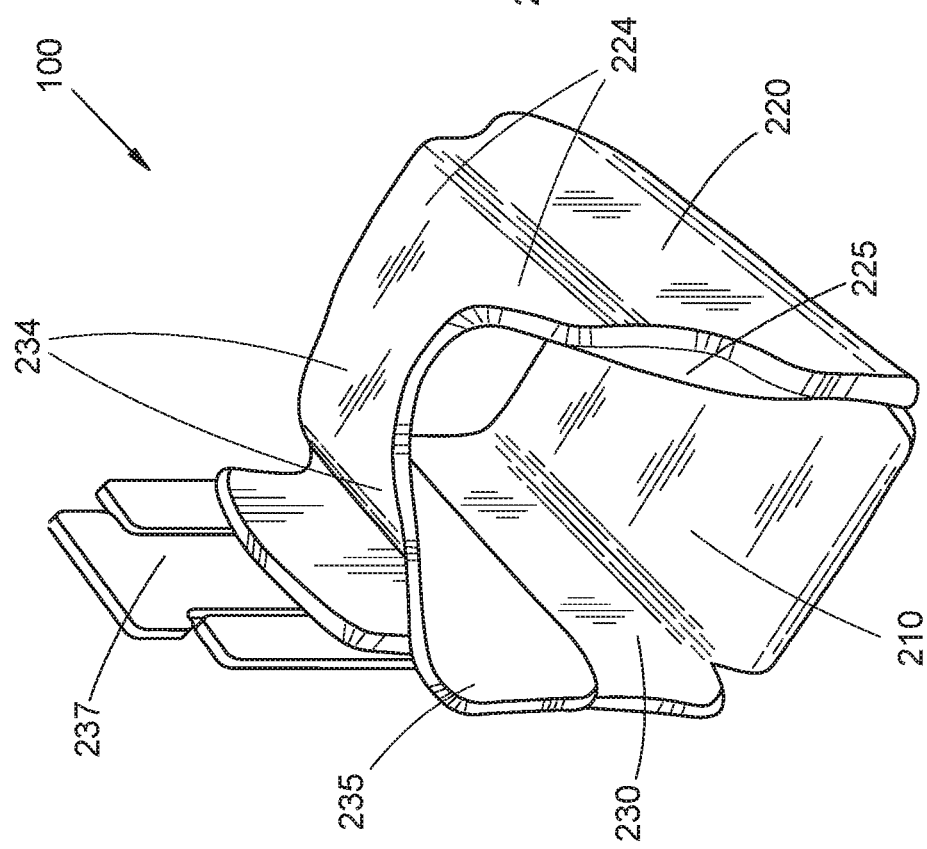
FIG. 1J
FIG. 1I

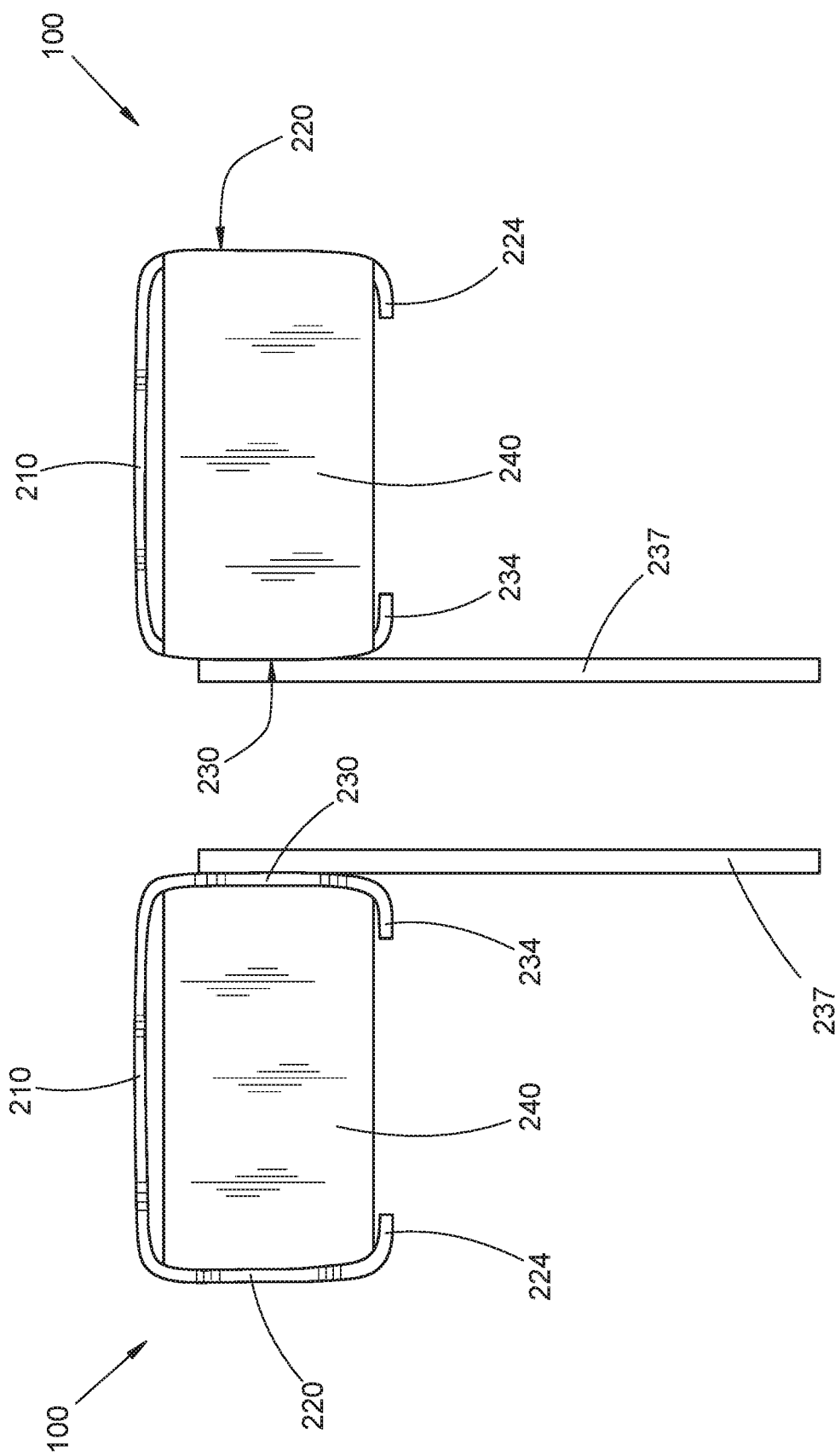

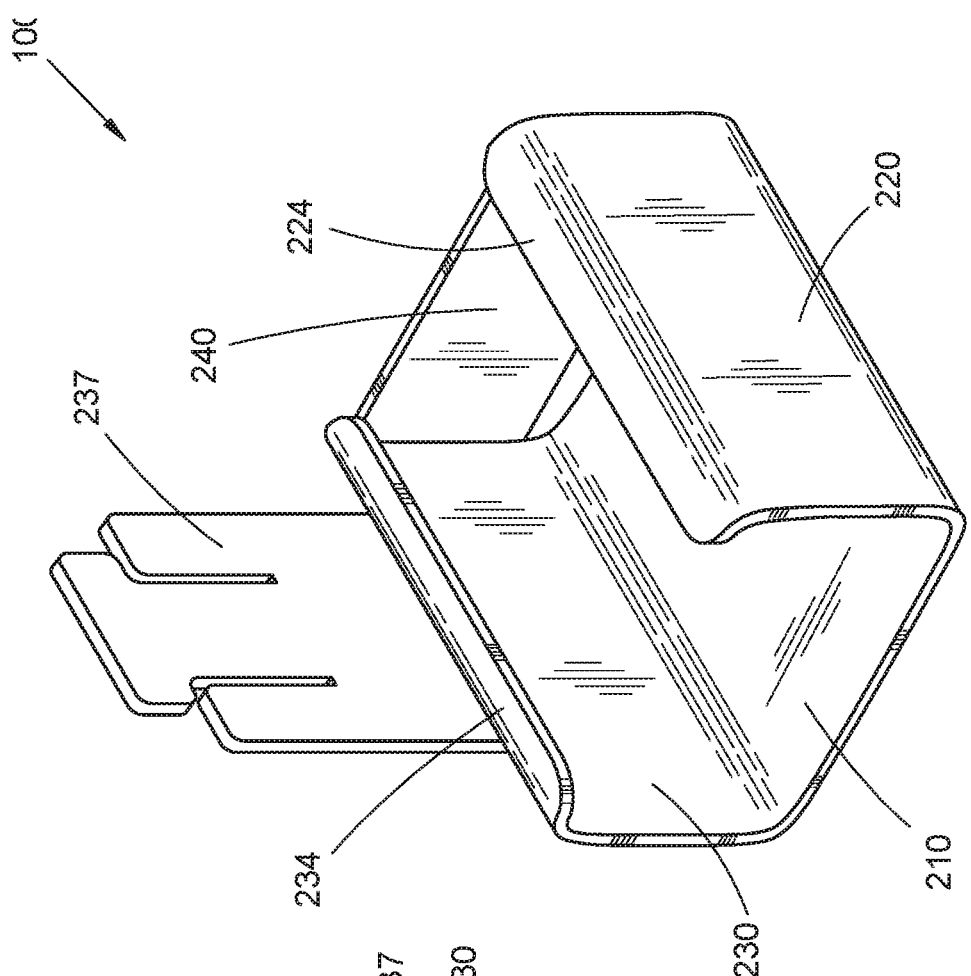
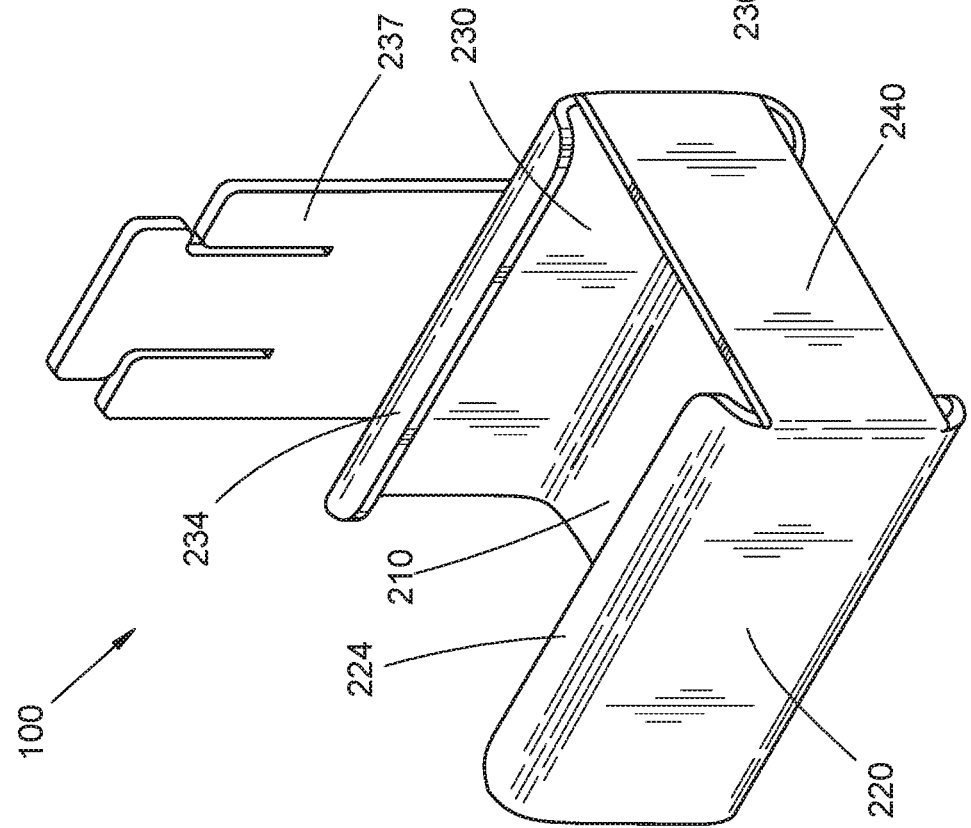

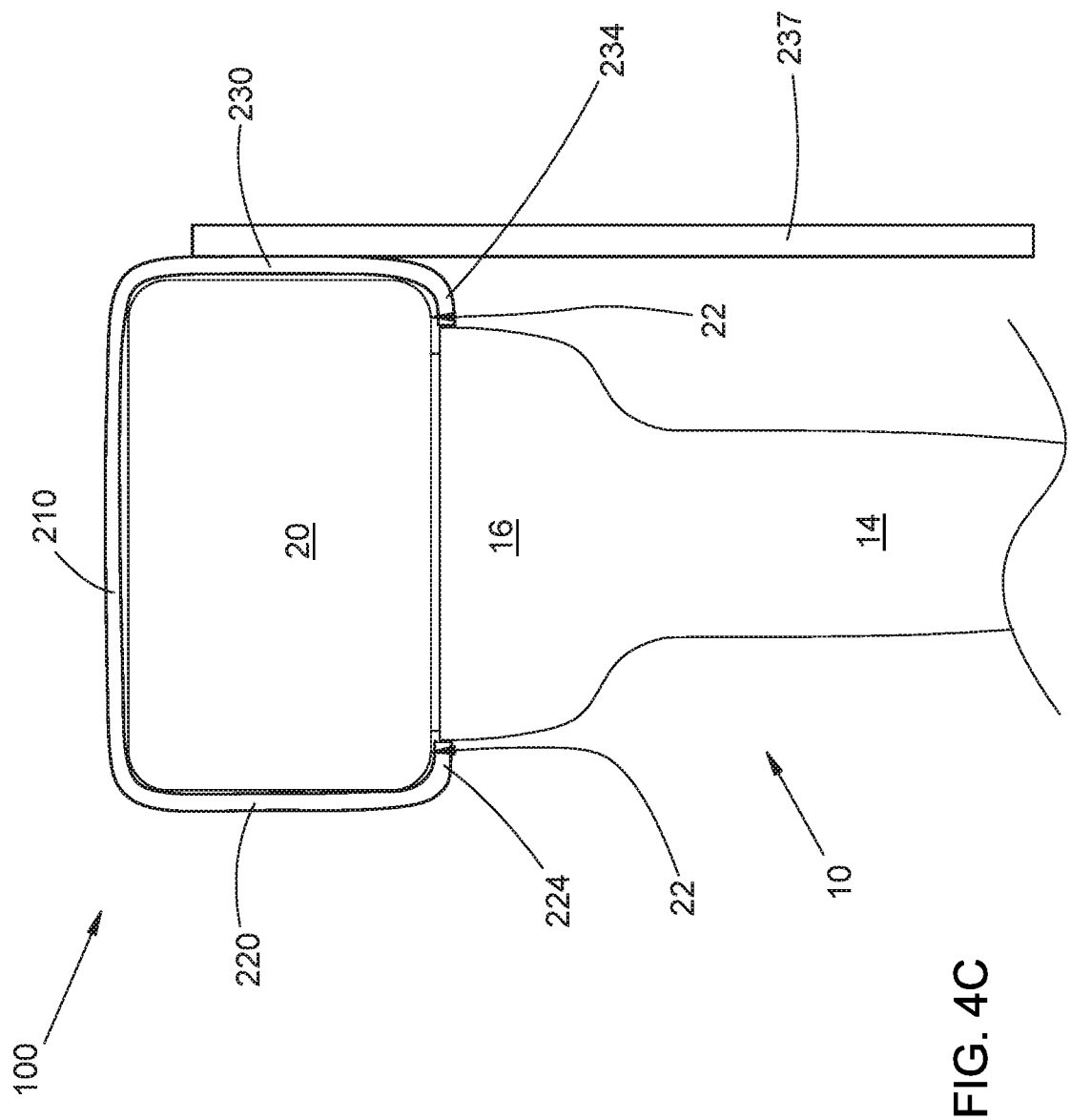

HOLDER FOR A BATTERY-POWERED TOOL

FIELD OF THE INVENTION

The field of the present invention relates to tool holders. In particular, a holder for a battery-powered tool, and methods for use of the same, are disclosed.

BACKGROUND

Some examples of holder for battery-powered tools are disclosed by:
- U.S. Pat. No. 4,917,281 entitled "Drill holster" issued Apr. 17, 1990 to Ostermiller;
- U.S. Pat. No. 5,450,993 entitled "Carry Holder" issued Sep. 19, 1995 to Guerrero et al;
- U.S. Pat. No. 5,984,046 entitled "Drill holster" issued Nov. 16, 1999 to Urso;
- U.S. Pat. No. 6,065,658 entitled "Tool holder for an electric drill" issued May 23, 2000 to Hashimoto;
- U. S. Pub. No. 2002/0003155 entitled "Ambidextrous drill holster" published Jan. 10, 2002 in the name of Holland et al;
- U. S. Pat. No. D455,901 entitled "Drill Holster for a Workbelt" issued Apr. 23, 2002 to Snider;
- U.S. Pat. No. 6,561,402 entitled "Ambidextrous drill holster" issued May 13, 2003 to Holland et al;
- U.S. Pat. No. 6,892,914 entitled "Carrier for battery powered tools" issued May 17, 2005 to Girbert;
- U. S. Pat. No. 2006/0266782 entitled "Tool holster constructions" issued Nov. 30, 2006 to Godshaw et al;
- U. S. Pat. No. 2007/0290017 entitled "Tool holster constructions" issued Dec. 20, 2007 to Godshaw et al;
- U. S. Pat. No. 2008/0073393 entitled "Holster assembly for integral attachment to a garment" issued Mar. 27, 2008 to Soderquist et al;
- U. S. Pat. No. 2015/0238002 entitled "Drill holster pouch" issued Aug. 27, 2015 to Kinskey; and
- U.S. Pat. No. 9,427,069 entitled "Drill holster" issued Aug. 30, 2016 to Carver et al.

SUMMARY

An inventive tool holder includes a body and mounting hardware. The tool holder is arranged for holding a battery-powered tool that includes a power head, a battery-engaging portion, a handle portion connecting the power head and the battery-engaging portion, and a battery engaged with the battery-engaging portion. The body of the inventive tool holder includes generally parallel first and second lateral panels and a central panel that joins and spaces apart the first and second lateral panels. The body is thereby structurally arranged so as to enclose partly and retain the battery with the battery engaged with the tool. The mounting hardware is attached to one of the lateral panels and enables attachment of the tool holder to a separate structure or object (e.g., a belt, harness, ladder, scaffold, toolbox, and so forth). Each one of the lateral panels includes a corresponding inwardly extending portion at its lower edge (opposite the edge connected to the central panel) to support the enclosed battery and obstruct movement of the enclosed battery out of the body in a direction generally perpendicular to the central panel. The inwardly extending portions are spaced apart at a first end of the body, enabling insertion of the battery between the lateral panels with the handle portion of the tool extending away from the central panel. The tool holder retains and supports the tool with the battery retained within the body and without any direct contact between the power head and the tool holder.

A method for using the inventive tool holder includes, with the tool holder supported by the separate structure or object, inserting the battery into the body with the battery passing between the lateral panels and with the handle portion extending away from the central panel. The tool is thus retained and supported by the tool holder without any direct support of the power head by the tool holder. The method can further include removing the tool from the tool holder by removing the battery from the body.

Objects and advantages pertaining to tool holders may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1A through 1J are various views of a first example of an inventive tool holder.

FIGS. 3A through 3J are various views of a second example of an inventive tool holder.

FIGS. 4A through 4C illustrate schematically retention of a tool using the example of FIGS. 3A-1J.

Figure 1D:
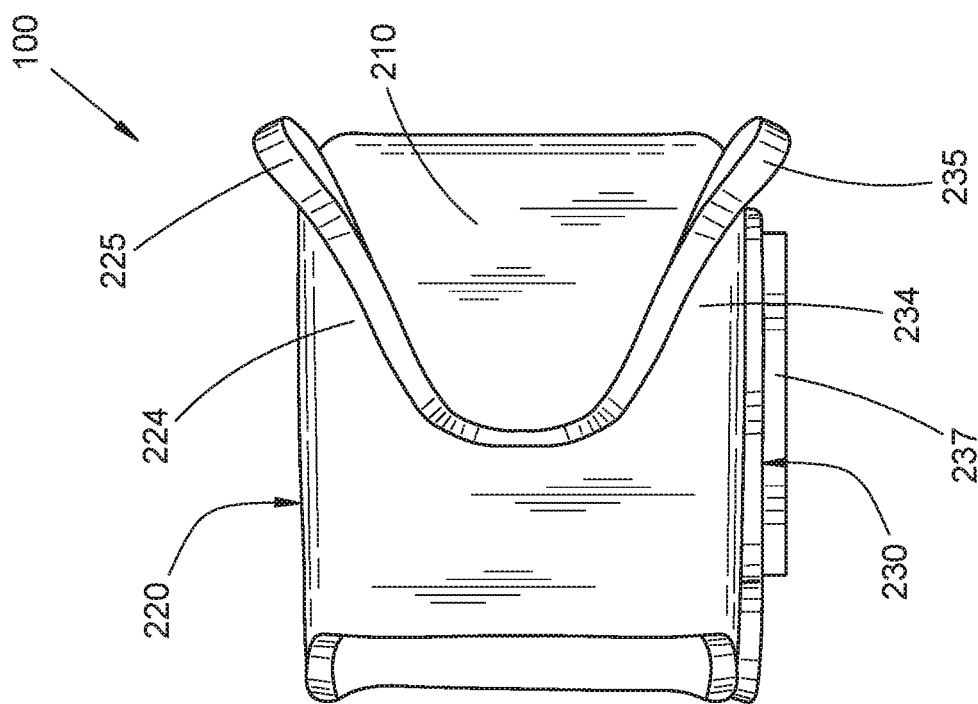
Figure 1C:
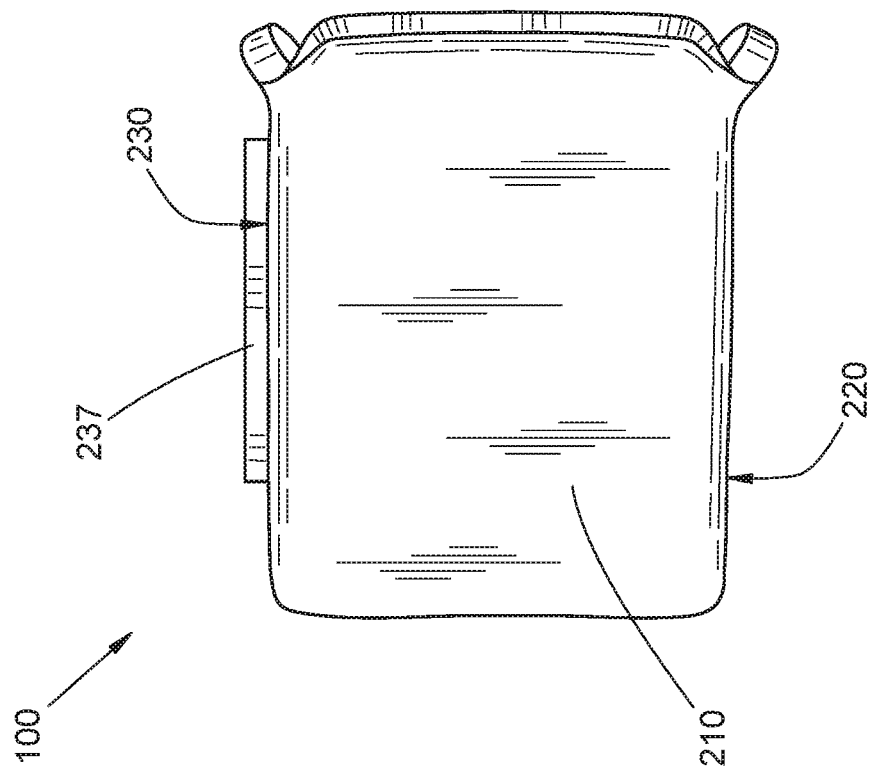
Figure 1F:
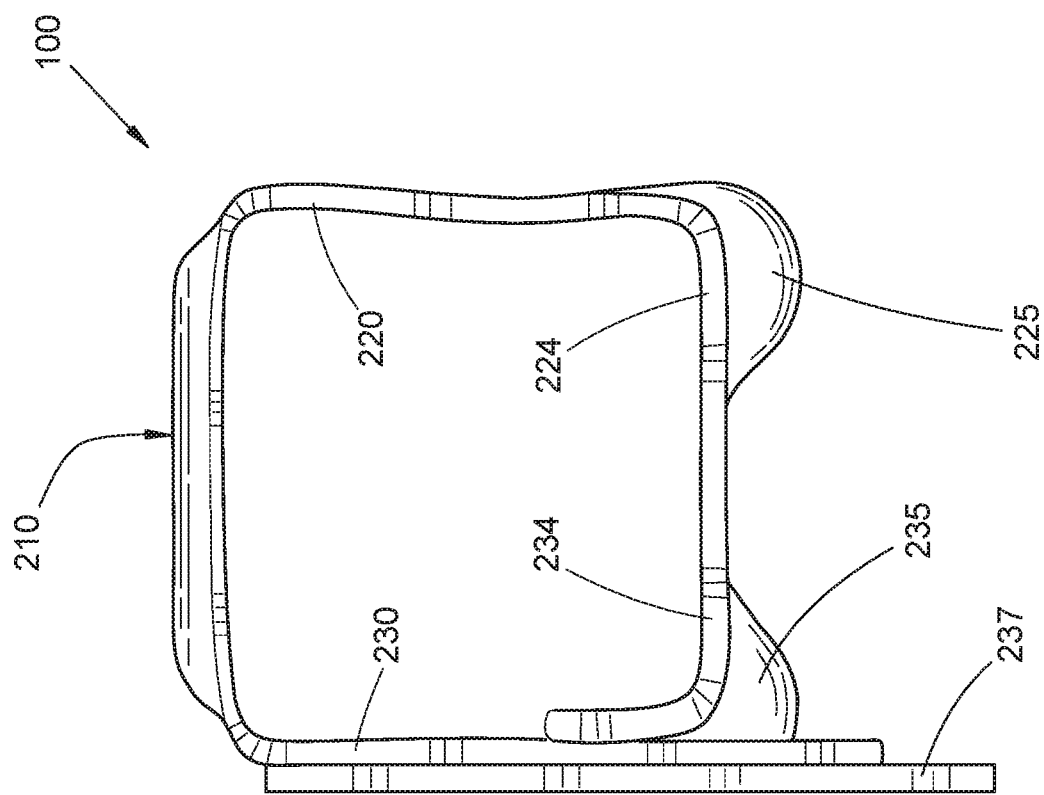
Figure 1E:
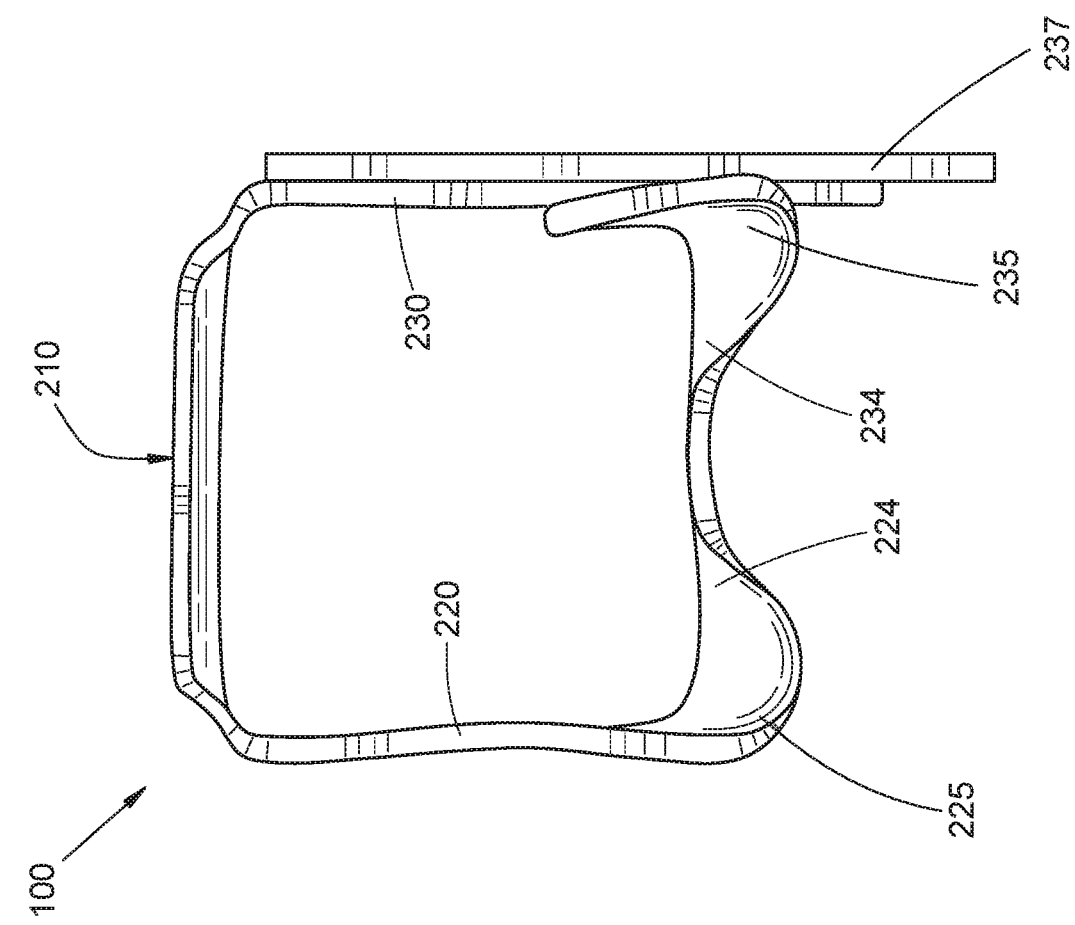
Figure 2A:
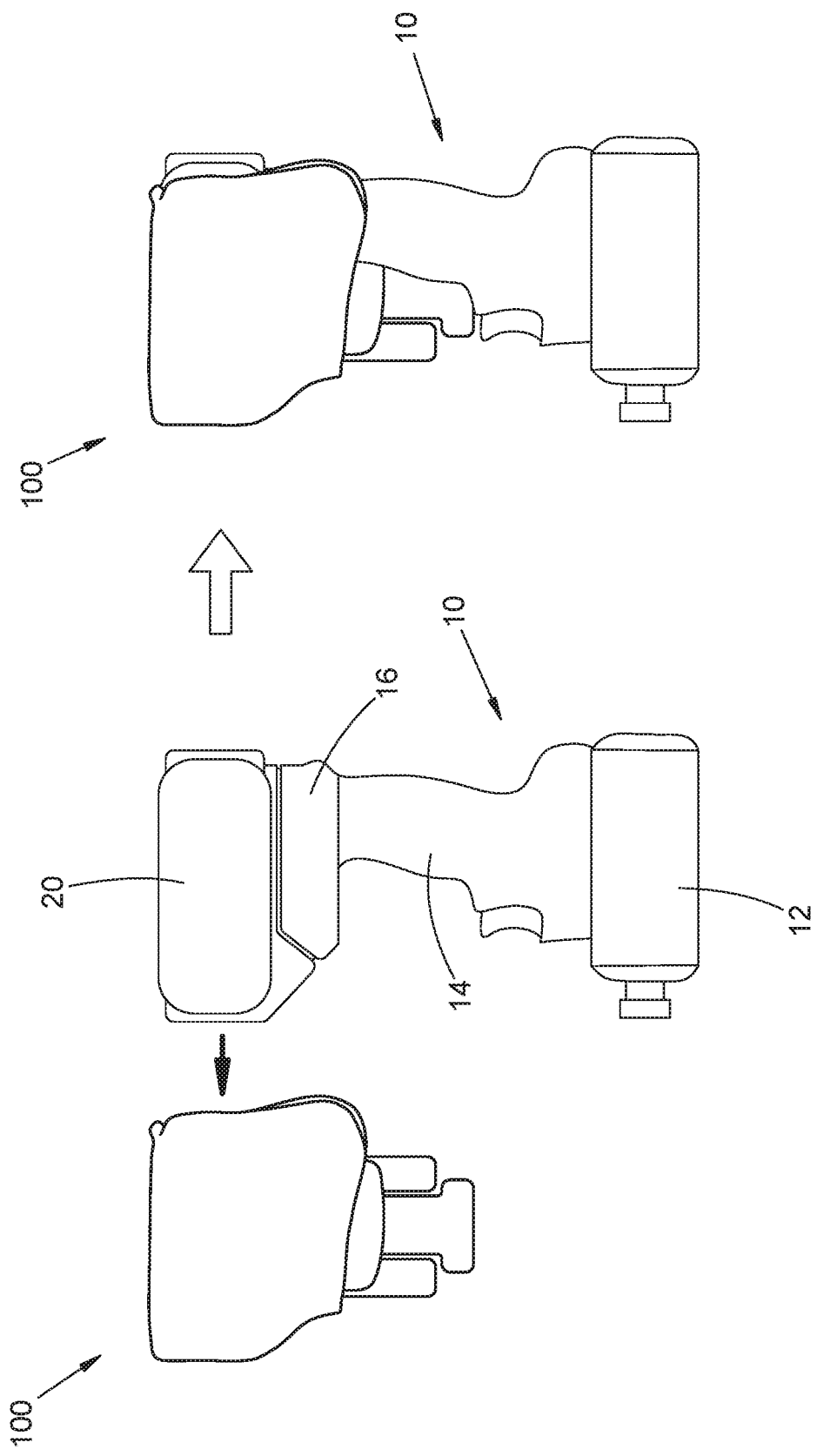
FIGS. 2A through 2C illustrate schematically retention of a tool using the example of FIGS. 1A-1J.
Figure 2B:
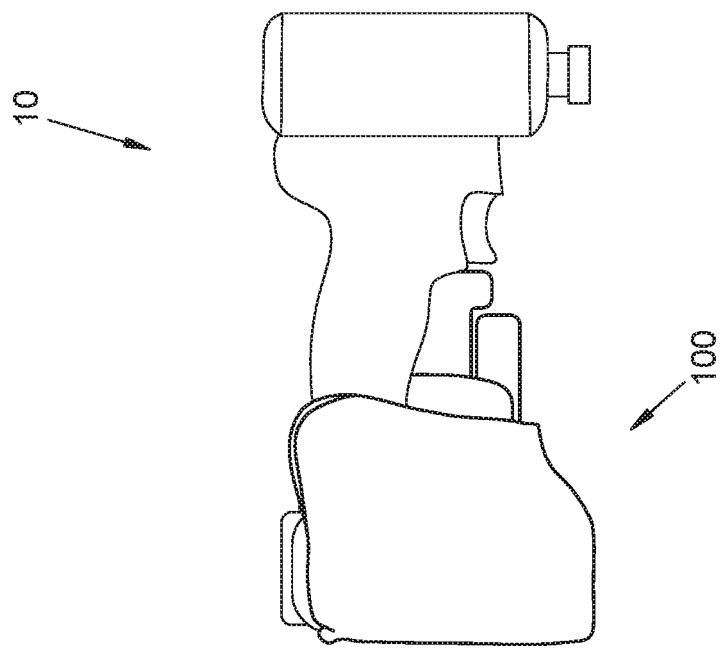
Figure 2B:
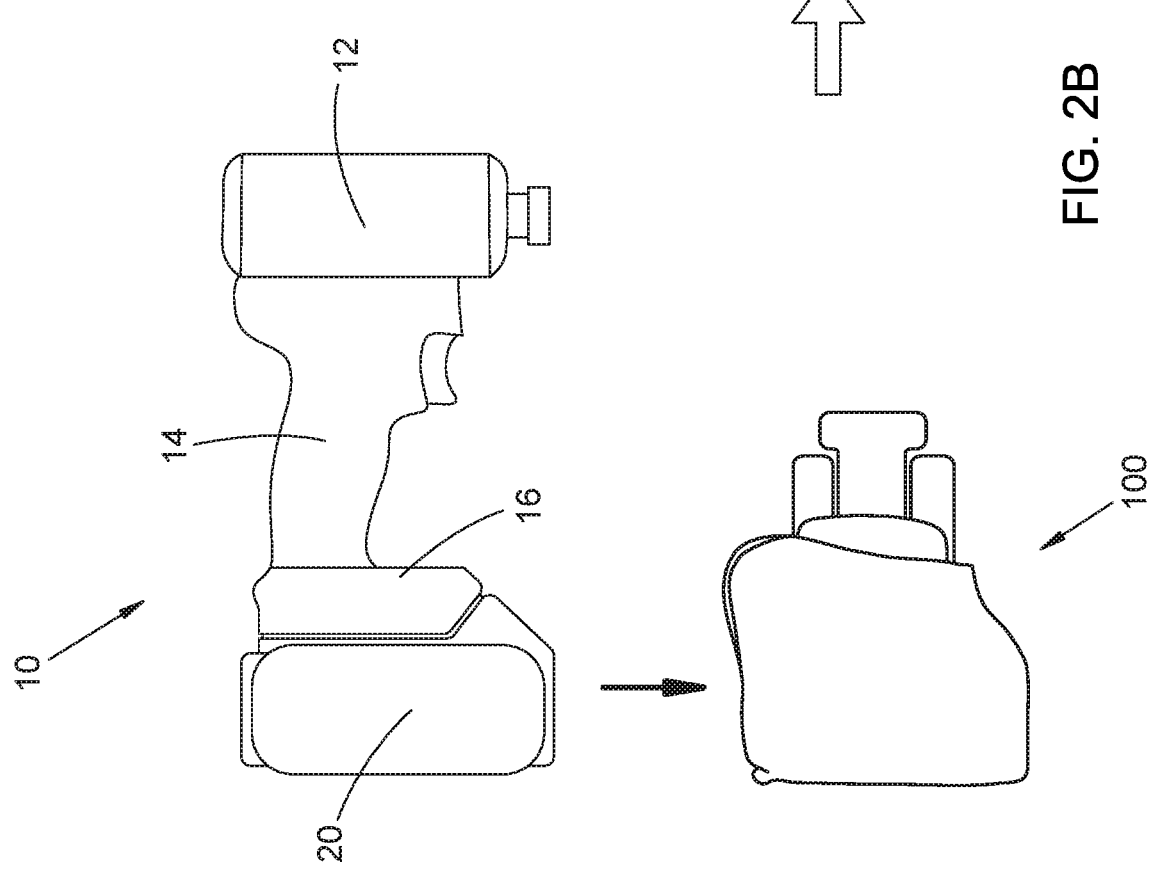
Figure 2C:
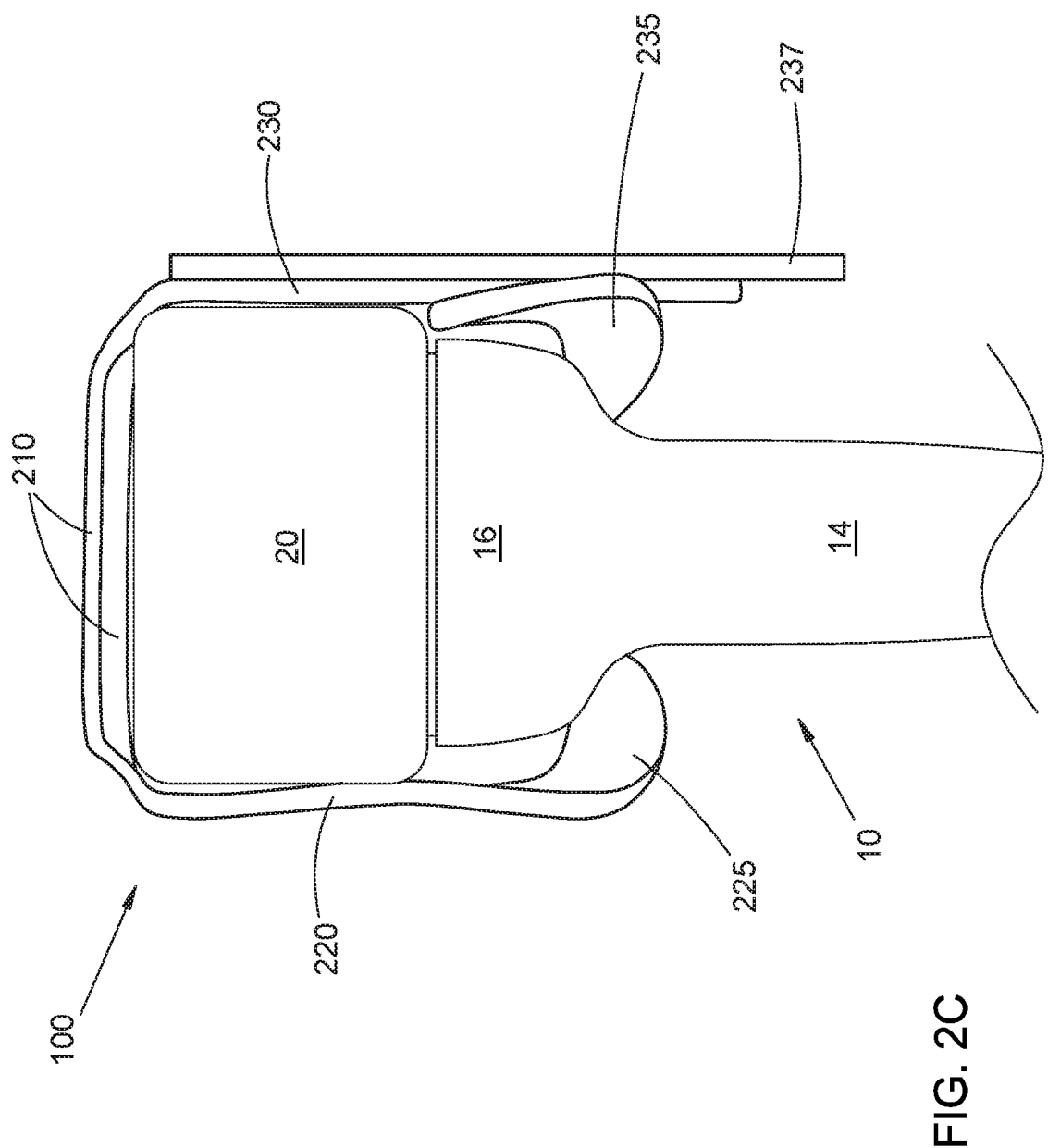
Figure 3B:
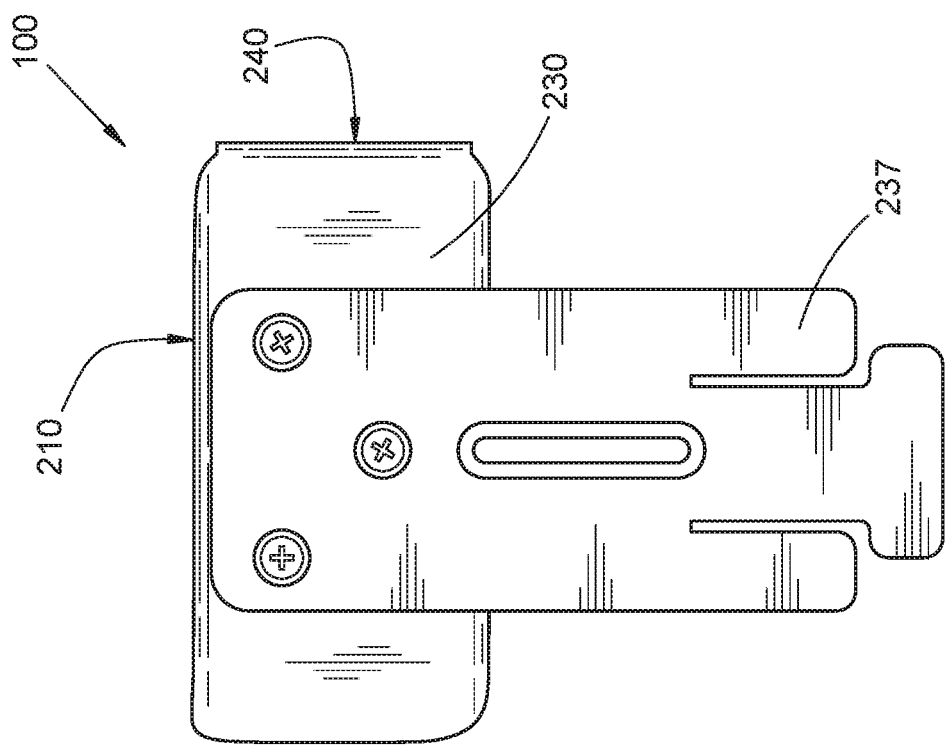
Figure 3A:
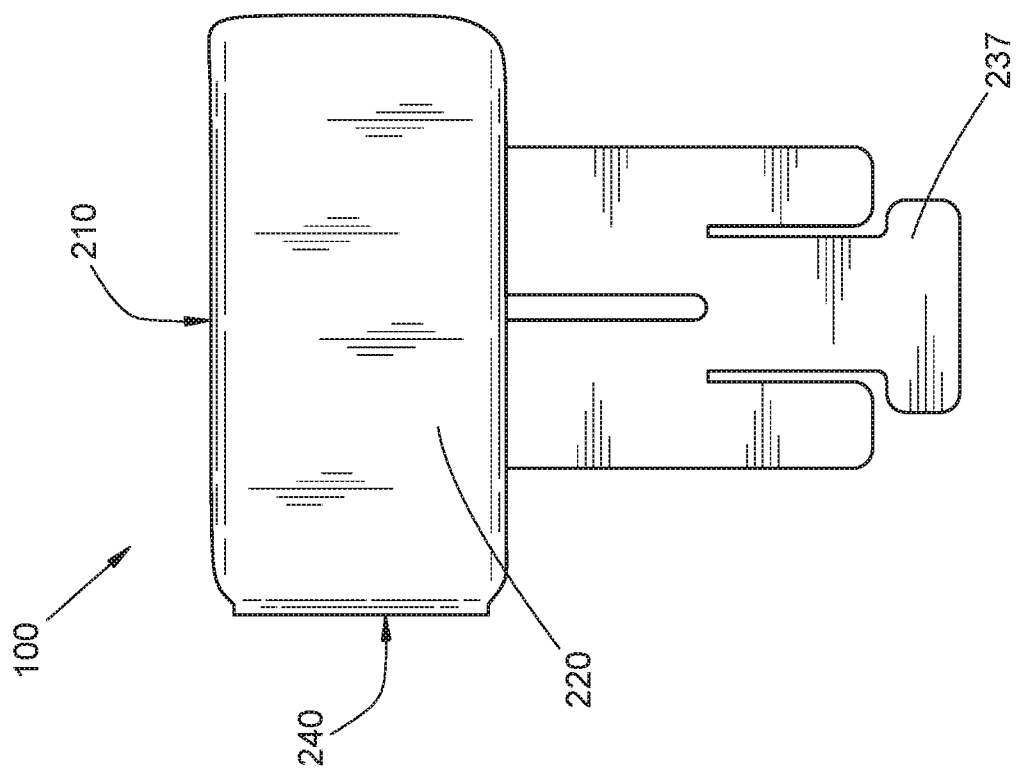
Figures 3C, 3D:
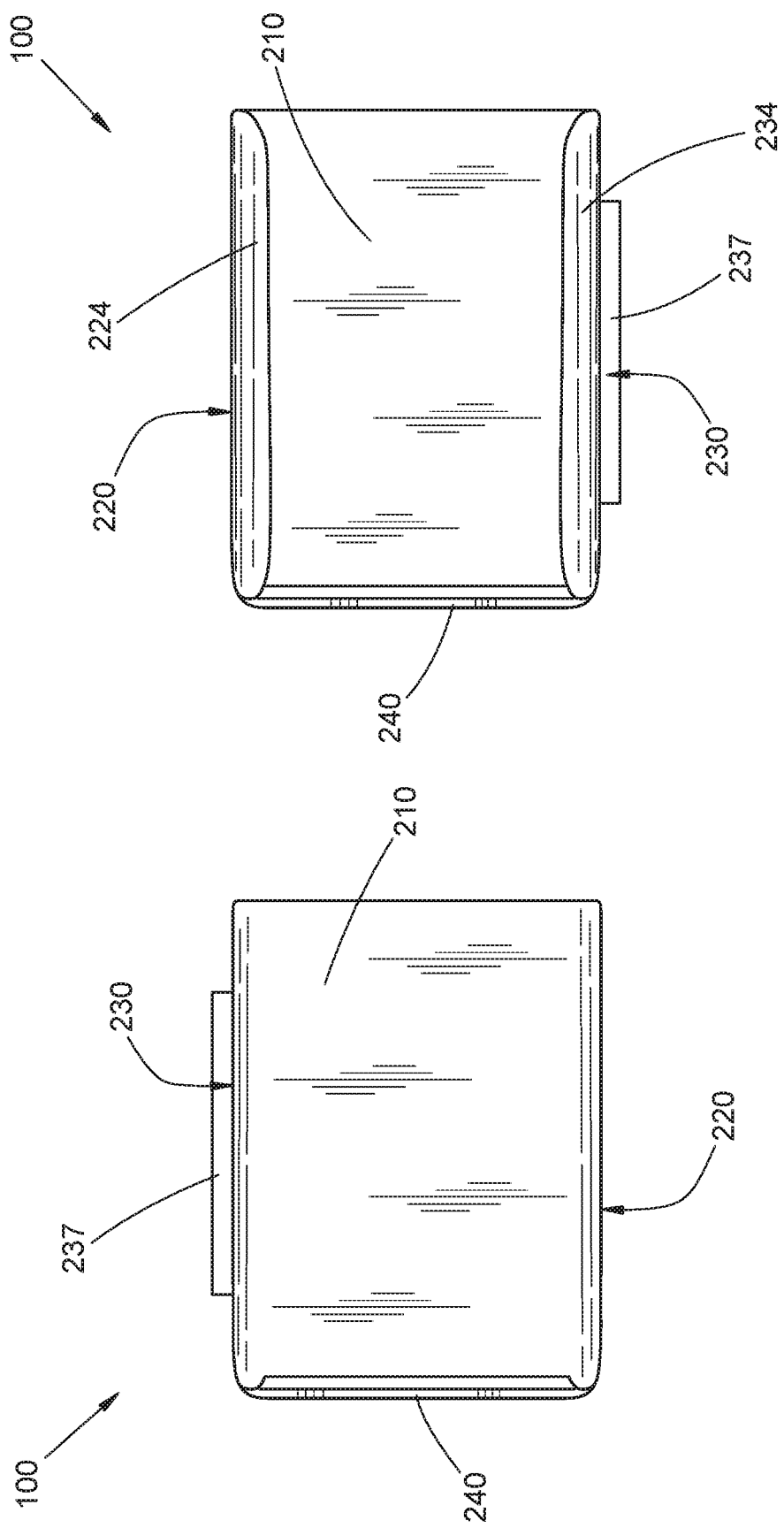
Figure 3H:
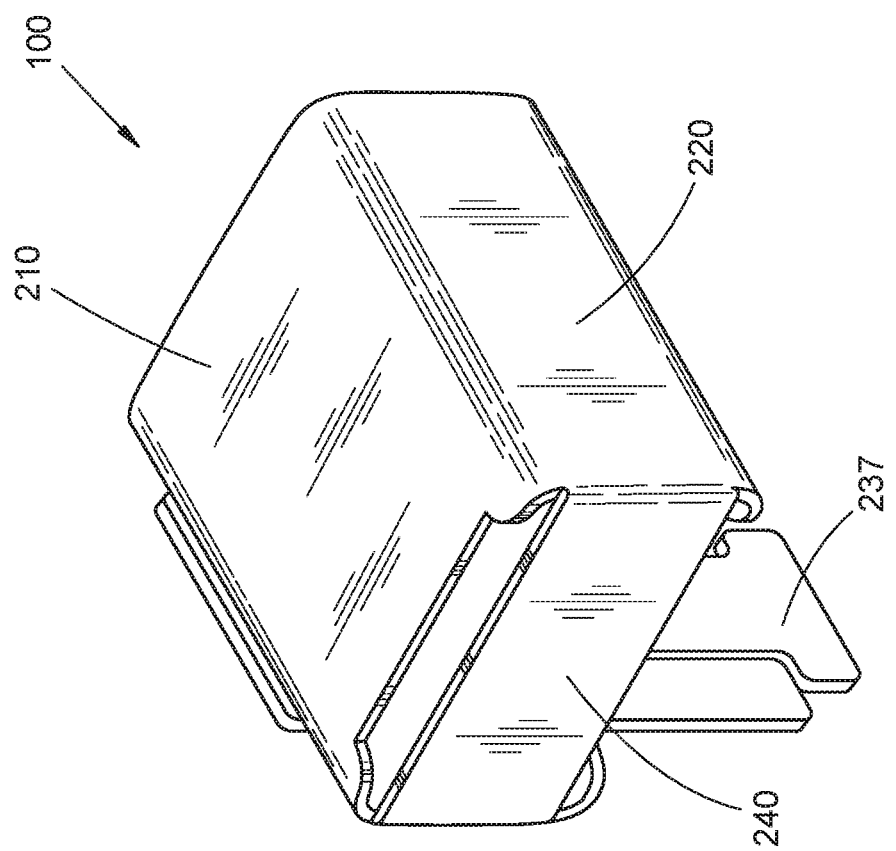
Figure 3G:
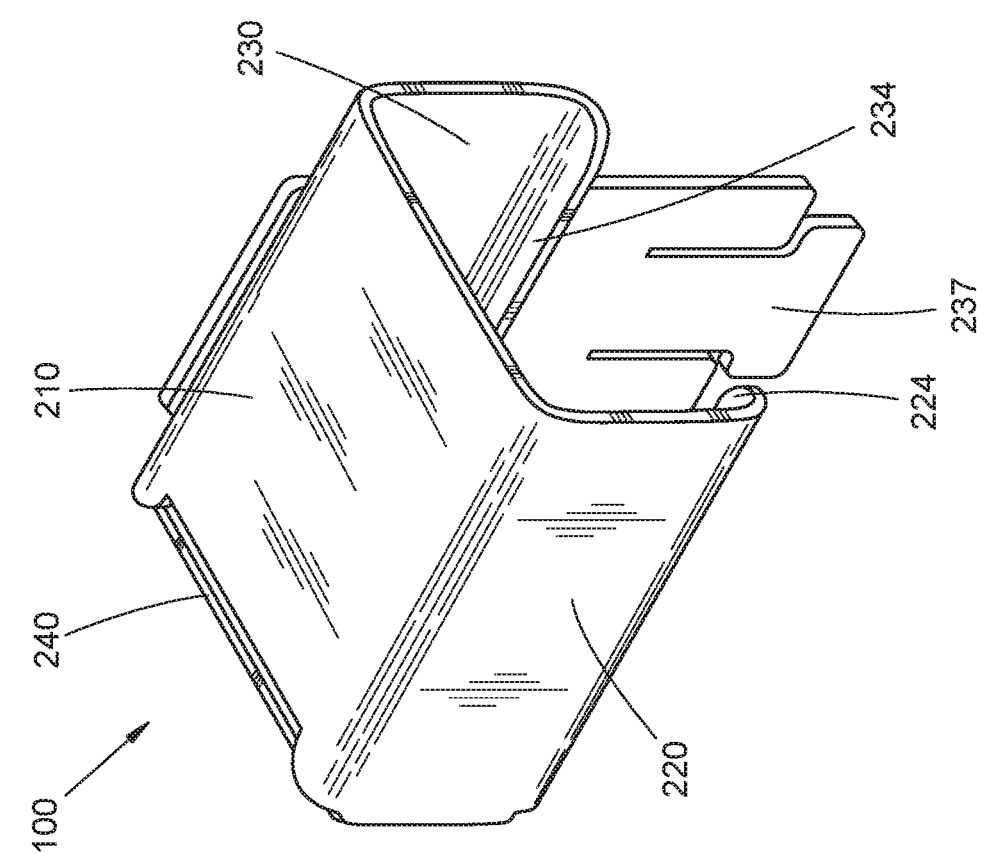
Figure 4A:
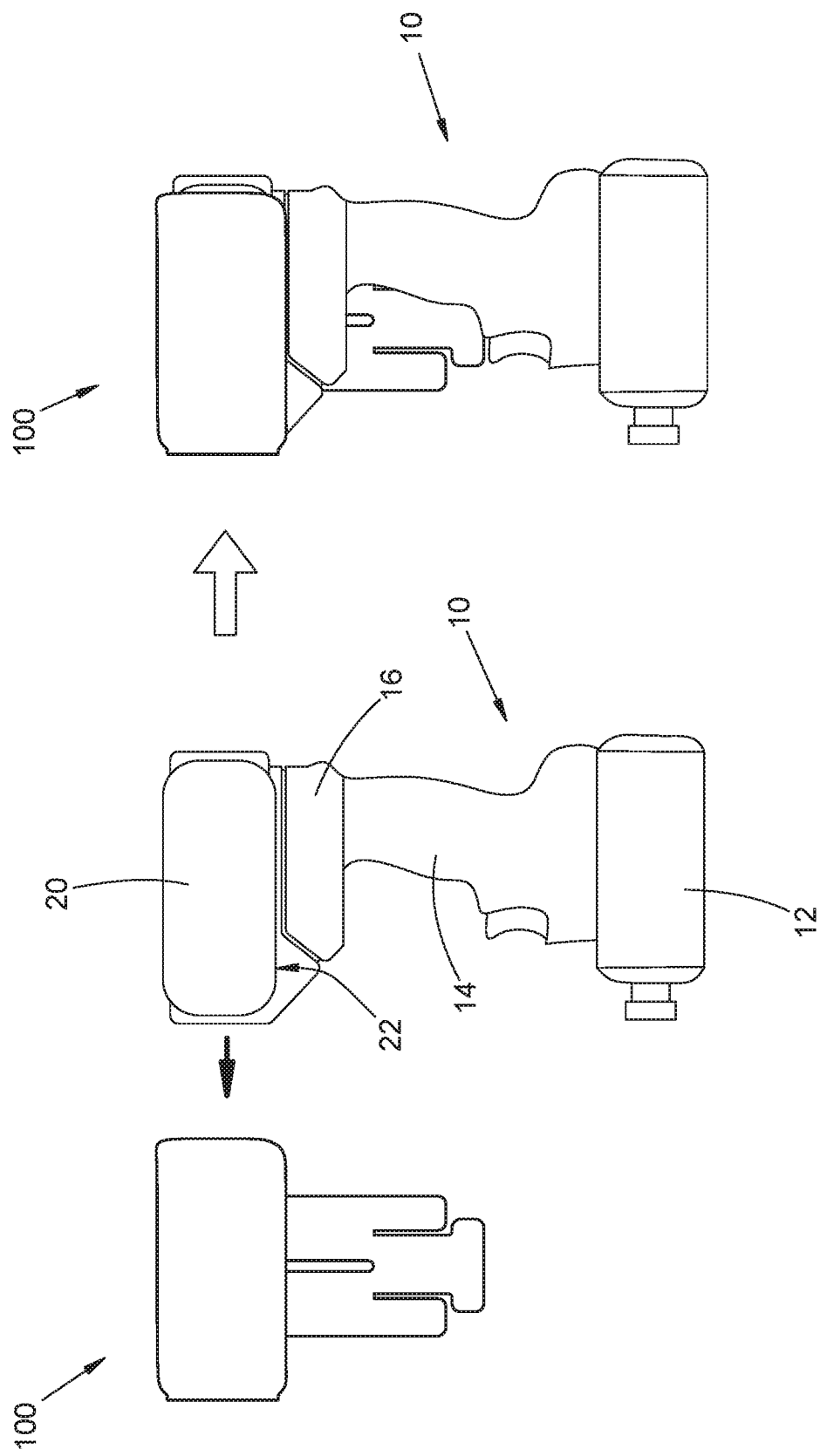
Figure 4B:
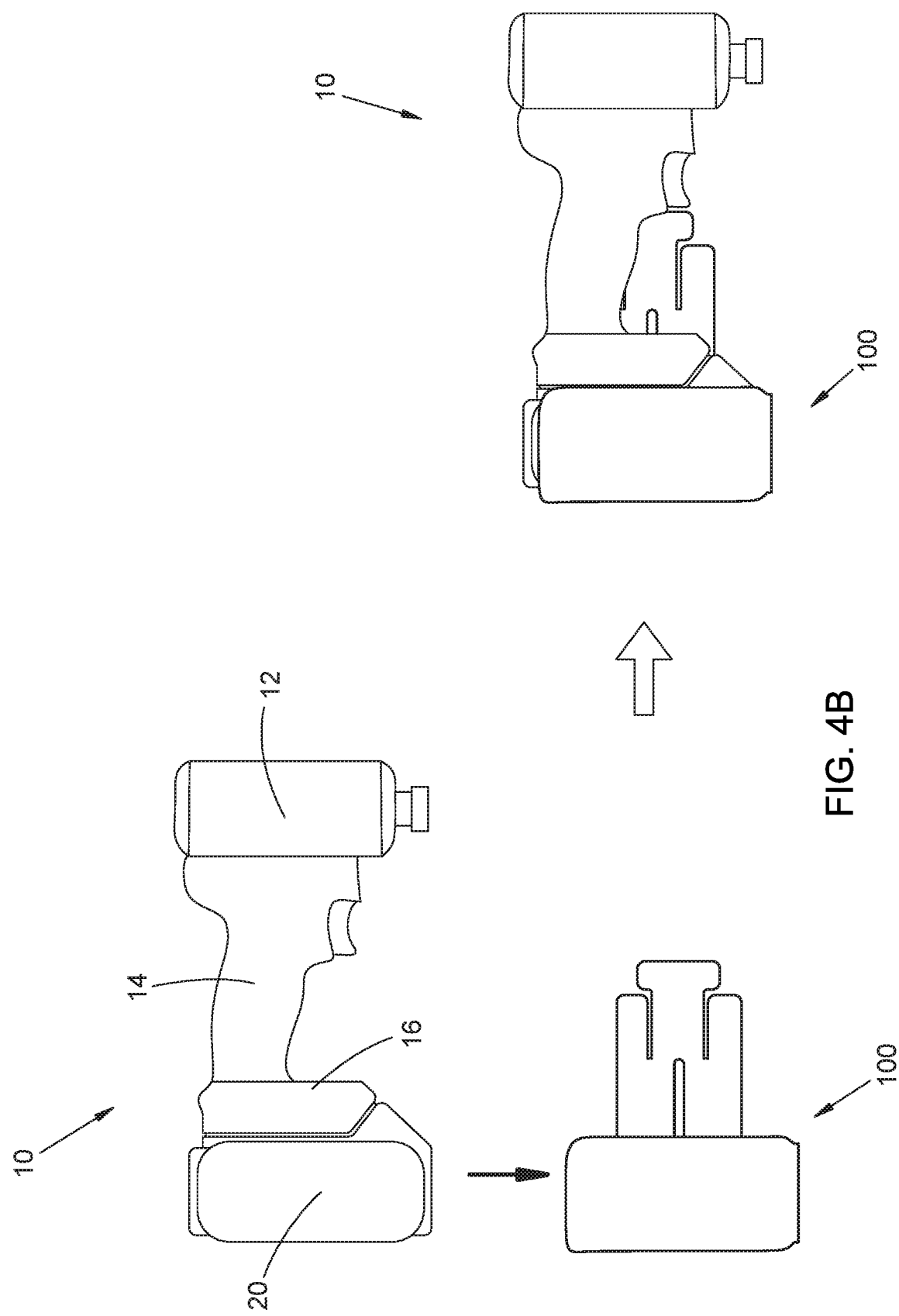

The embodiments depicted may be shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION OF EMBODIMENTS

A generic battery-powered tool 10 is depicted in the drawings and incudes a power head 12 (e.g., the motor, motor-housing, and chuck of a power drill), a battery-engaging portion 16, a handle portion 14 connecting the power head 12 and the battery-engaging portion 16, and a battery 20 engaged with the battery-engaging portion 16. In many instances the battery 20 is readily attached to or detached from the battery-engaging portion 16 to enable swapping of drained and charged batteries 20, or use of one or more compatible interchangeable batteries 20 with multiple different tools 10. The handle portion has a smaller transverse cross section than the power head 12 or the battery 20; the battery-engaging portion 16 at the bottom end of the handle 14 often also has an enlarged cross section relative to the handle 14, but this need not always be the case.

Conventional tool holders, including the examples listed above, include a sleeve or holster portion that receives and retains the power head 12 of the power tool 10. Some convention tool holders also include a portion that receives and supports the battery 20. In those conventional tool holders, the tool 10 is held in a more or less horizontal orientation (i.e., with the battery 20 and power head 12 at roughly the same height, typically with the chuck of a power drill pointed downward). The power tool 10 typically is inserted into or removed from the conventional tool holders by generally vertical movement of the tool. The conventional tool holders are arranged to hold the power tools at a user's side or against the front or side of the user's torso for enabling ready access to the tool and facilitate its insertion into or removal from the conventional tool holder. Because the battery 20 is often the heaviest part of the tool 10, conventional tool holders often include one or more retaining straps that prevent the weight of the battery 20 from pulling the tool out of the holder.

An inventive tool holder 100 includes a body and mounting hardware. A first example is shown in FIGS. 1A-1J and 2A-2C; a second example is shown in FIGS. 3A-3J and 4A-4C. The body includes generally parallel first and second lateral panels 220/230 and a central panel 210 that joins and spaces apart the first and second lateral panels 220/230. The panels 210/220/230 are structurally arranged to enclose partly and retain the battery 20 inserted into the body while the battery 20 is engaged with the tool 10. The mounting hardware is attached to one of the lateral panels 220/230 (panel 230 in the examples shown and described below) and enables attachment of the tool holder 100 to a separate structure or object. In some examples the separate structure or object can be, e.g., a belt, harness, vest, or shoulder strap, so that a user can carry the tool 10 in the holder 100; in other examples the separate structure or object can be, e.g., a ladder, scaffold, tool bench, work bench, toolbox, tool bucket, or tool rack. The lateral panels 220/230 include at their edges (opposite the edges connected by the central panel 210) corresponding inwardly extending portions 224/234. The inwardly extending portions 224/234 are structurally arranged to support the enclosed battery 20 and obstruct its movement out of the body in a direction generally perpendicular to the central panel 210. The inwardly extending portions 224/234 are spaced apart at a first side of the body so that the battery 20 can be inserted into the body between the lateral panels 220/230 with the handle portion 14 extending away from the central panel 210. With the battery 20 thus inserted into the body, the tool holder 100 retains and supports the tool 10 without any direct contact between the power head 12 and the tool holder 100.

With the inventive tool holder 100 supported, e.g., on a user's body by the belt, harness, vest, or shoulder strap, or on a ladder, scaffold, toolbox, or on another similar object or structure, the user can insert the battery 20 into the body with a portion of the tool 10 (battery 20, battery-engaging portion 16, or handle portion 14) passing between the outwardly extending portions 224/234 of the lateral panels 220/230. The tool 10 can be thus retained and supported by the tool holder 100 in a generally inverted orientation, in a generally horizontal orientation, or in an intermediate orientation, without any direct contact between the power head 12 and the inventive tool holder 100. The tool 10 can be removed from the tool holder 100 by withdrawing the battery 20 from the body. With the tool 10 retained in a generally vertical orientation, the battery 20 is inserted into and removed from the body by generally horizontal movement past the first end of the body (e.g., as in FIGS. 2A and 4A). With the tool 10 retained in a generally horizontal orientation, the battery 20 is inserted into and removed from the body by generally vertical movement past the first end of the body (e.g., as in FIGS. 2B and 4B). In particular, in the generally horizontal orientation no additional retaining strap is needed (as is often the case with conventional tool holders) because the inventive tool holder 100 engages and retains the heaviest part of the tool 10, i.e., the battery 20; the weight of the power head 12 is insufficient to pull the battery 20 upward out of the body of the inventive tool holder 100. In either a vertical or horizontal orientation, or in an intermediate orientation, the inventive tool holder 100 holds the tool 10, without any additional retaining straps, at least as securely as a conventional tool holder that employs such retaining straps.

The inventive tool holder 100 can be positioned in any desired, convenient, or suitable position on the user's body using the belt, harness, vest, or shoulder strap, or can be positioned on another object or structure (including those mentioned above). In some examples, the inventive tool holder can be attached to a belt and positioned at the user's lower back or at the user's side. The back position can keep the tool 10 out of the user's way while performing other tasks; the side position can keep the tool 10 within easier reach. The generally inverted orientation of the tool 10, and generally horizontal movement of the battery 20 into and out of the body, can facilitate removal or insertion of the tool 10 into the tool holder 100 by the user while the tool holder 100 is positioned at the user's back. The generally horizontal orientation of the tool 10, and generally vertical movement of the battery 20 into and out of the body, can facilitate removal or insertion of the tool 10 into the tool holder 100 by the user while the tool holder 100 is positioned at the user's side. Either a vertical or horizontal orientation, or an intermediate orientation, can be usefully employed at any suitable or desirable position relative to a user's body, or with the tool holder attached to another object or structure, such as a ladder, scaffold, and so forth.

In some examples (e.g., as in the example of FIGS. 1A-1J and 2A-2C), the inwardly extending portions 224/234 of the lateral panels 220/230 are joined together at a second end of the body opposite the first end. That arrangement obstructs movement of any portion of the tool 10 (e.g., the battery 20, the battery-engaging portion 16, or the handle portion 14) past the second end of the body, so that the battery 20 can only enter and exit the body through its first end. In some examples (e.g., as in the example of FIGS. 3A-3J and 4A-4C), the body includes an end panel 240 connecting edges of the front and back panels 220/230 at a second end of the body opposite the first end. That arrangement obstructs movement of the battery 20 past the second end of the body, so that the battery 20 can only enter and exit the body through its first end. In some examples (not shown), the body can include both arrangements, i.e., joined portions 224/234 and an end panel 240. Any of those arrangements (joined portions 224/234, end panel 240, or both) can enhance the structural rigidity of the body.

The body can include any one or more suitable materials that provide it with sufficient rigidity to support and retain the battery 20 enclosed within it, and the tool 10 of which the battery 20 is a part. Examples of suitable materials can include, e.g., one or more metals, one or more polymer resins, natural or synthetic leather, or combinations thereof such as leather-covered metal or polymer-overmolded metal. In some examples, the substantially rigid body can nevertheless deform slightly upon insertion of the battery 20. Such deformation of the body urges the front and back panels 220/230 toward the battery 20 so as to frictionally engage the battery 20 and retain it within the body 20. In some examples, the body can include a detent-type mechanism (not shown) arranged to engage the battery 20 upon its insertion into the body 20. An example of a suitable detent-type mechanism can include a tab on the body that engages a mating slot in the battery 20 or battery-engaging portion 16; slight deformation of the substantially rigid body can enable engagement and disengagement of such a detent-type mechanism. Either of those arrangements (i.e., frictionally engaged or having a detent-like mechanism) can reduce the likelihood of the tool 10 accidentally falling out of the tool holder 100, while nevertheless permitting intentional insertion or removal of the tool 10.

In some examples (e.g., such as that of FIGS. 3A-3J and 4A-4C), the body can be arranged so that it engages only the battery 20 of the tool 10. That arrangement can be employed, e.g., when the battery 20 includes transverse slots, ridges, or ledges along its sides (e.g., the ledge 22 indicated in FIGS. 4A and 4C), or when the battery's transverse cross section is larger than that of the battery-engaging portion 16. In some examples (e.g., such as that of FIGS. 1A-1J and 2A-2C), the body can be arranged so that it engages both the battery 20 and the battery-engaging portion 16 of the tool 10. That arrangement can be employed, e.g., when the battery-engaging portion 16 has a transverse cross section that is about equal to that of the battery 20. It should be noted that different manufacturers provide tools 10 and batteries 20 with differing sizes or form factors. In some examples, the body can be sized and shaped for engaging the battery 20, and in some instances also the battery-engaging portion 16, of battery-powered tools 10 from a specific manufacturer of such tools. A different version of the inventive tool holder 100 can be provided for each different manufacturer. In some examples, the inventive tool holder 100 can be arranged to accommodate batteries 20, and in some instances also battery-engaging portions 16, from multiple different manufacturers of battery-powered tools 10.

In some examples (e.g., such as that of FIGS. 1A-1J and 2A-2C), at least portions 225/235 of the lateral panels 220/230 can be flared outward at the first end of the body. That arrangement can act like a funnel to guide insertion of the battery 20 into the tool holder 100. In some of those examples, the front and back panels 220/230 can be flared outward along their entire edges at the first end of the body. In some examples (e.g., such as that of FIGS. 1A-1J and 2A-2C), the central panel 210 can be similarly flared upward at the first end of the body. In some examples (e.g., such as that of FIGS. 3A-3J and 4A-4C), the inwardly extending portions 224/234 or the lateral panels 220/230 can be tapered toward the first end of the body. That arrangement can act to guide insertion of the battery 20 into the tool holder 100.

In some examples (not shown), the mounting hardware can be arranged so attach the lateral panel 230 directly to a belt, harness, vest, or shoulder strap, or to a ladder, scaffold, toolbox, or work bench, or to another object or structure. Any one or more suitable fasteners, hooks, slots, holes, grommets, straps, loops, laces, or other mounting hardware can be employed. In some examples (e.g., including the examples shown), the mounting hardware can include a mounting panel or bracket 237 facing and attached to one of the lateral panels 220/230 (lateral panel 230 in the examples shown). The mounting panel or bracket 237 can be arranged in any suitable way, including those mentioned above, to enable attachment to or detachment from a lateral panel 220 or 230. The mounting panel or bracket 237 can be further arranged in any suitable way for being attached to a belt, harness, vest, or shoulder strap, or to a ladder, scaffold, toolbox, or work bench, or to another object or structure, including those mentioned above. In some examples (including those shown), the mounting hardware can include a mounting bracket 237 attached to one of the lateral panels 220/230, and that mounting bracket 237 can mate with a corresponding bracket on a belt, harness, vest, or shoulder strap, or on a ladder, scaffold, toolbox, or work bench, or to another object or structure. In some examples that include the mounting panel or bracket 237, the mounting hardware can be structurally arranged so as to enable attachment of the body to an object or structure in any one of multiple relative positions or orientations. Such adjustability can enable adjustment of the inventive tool holder 100 to hold the tool 10 in a generally inverted orientation in some instances or to hold the tool 10 in a generally horizontal orientation in other instances, or can allow a user to find an intermediate orientation for the tool holder 100 that enables easiest access to the tool 10 for removing it from, or inserting it into, the inventive tool holder 100.

The inventive tool holder 100 has an inherent handedness. In some examples (e.g., including the examples shown), the tool holder 100 can be arranged in a right-handed configuration wherein, with the tool holder 100 positioned at a user's right side and with the tool 10 in an inverted orientation, the first end of the body faces forward. In other examples (e.g., including mirror images of the examples shown), the tool holder 100 can be arranged in a left-handed configuration wherein, with the tool holder 100 positioned at a user's left side and with the tool 10 in an inverted orientation, the first end of the body faces forward. In some examples, the inventive tool holder 100 can be provided in either right- or left-handed arrangements, with the mounting hardware not readily removeable from the lateral panel 230 (e.g., not removeable without tools or without damaging the tool holder 100). In other examples, the mounting hardware can be arranged to enable attachment to and detachment from both lateral panels 220/230. In such an arrangement, the mounting hardware can be detached from the lateral panel 230 and reattached to the lateral panel 220, switching the roles of the lateral panels 220/230 and reversing the handedness of the inventive tool holder 100.

Figure 6:
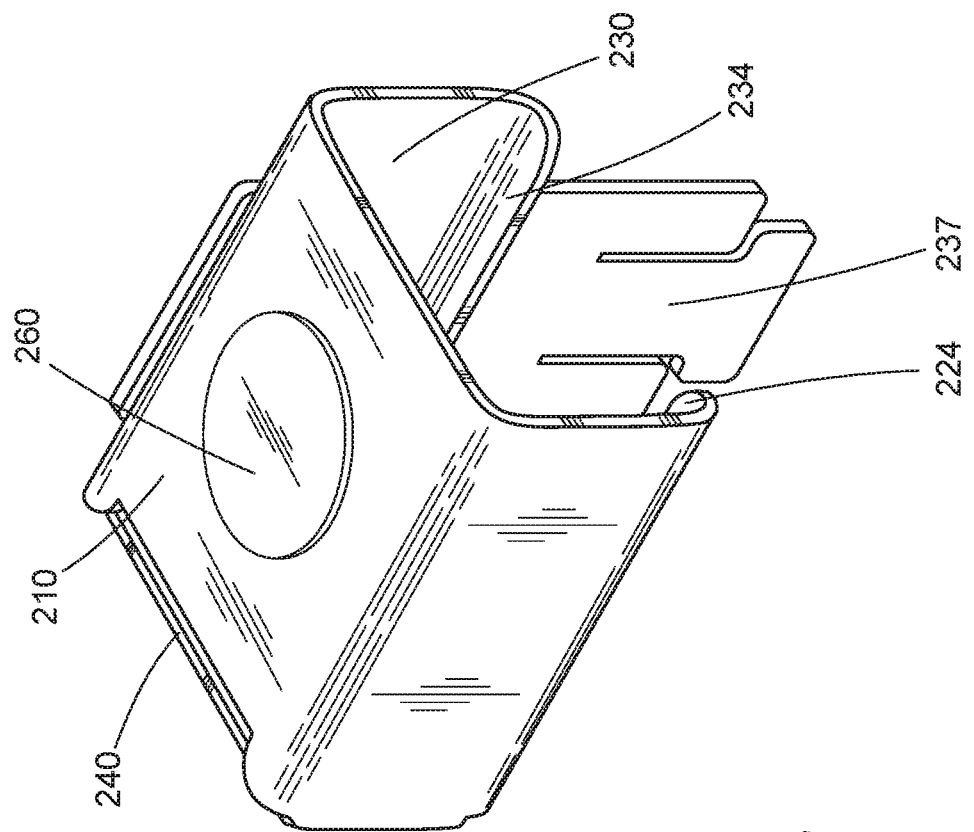
FIG. 6 illustrates schematically an alternative arrangement of the example of FIGS. 3A-3J.
Figure 5:
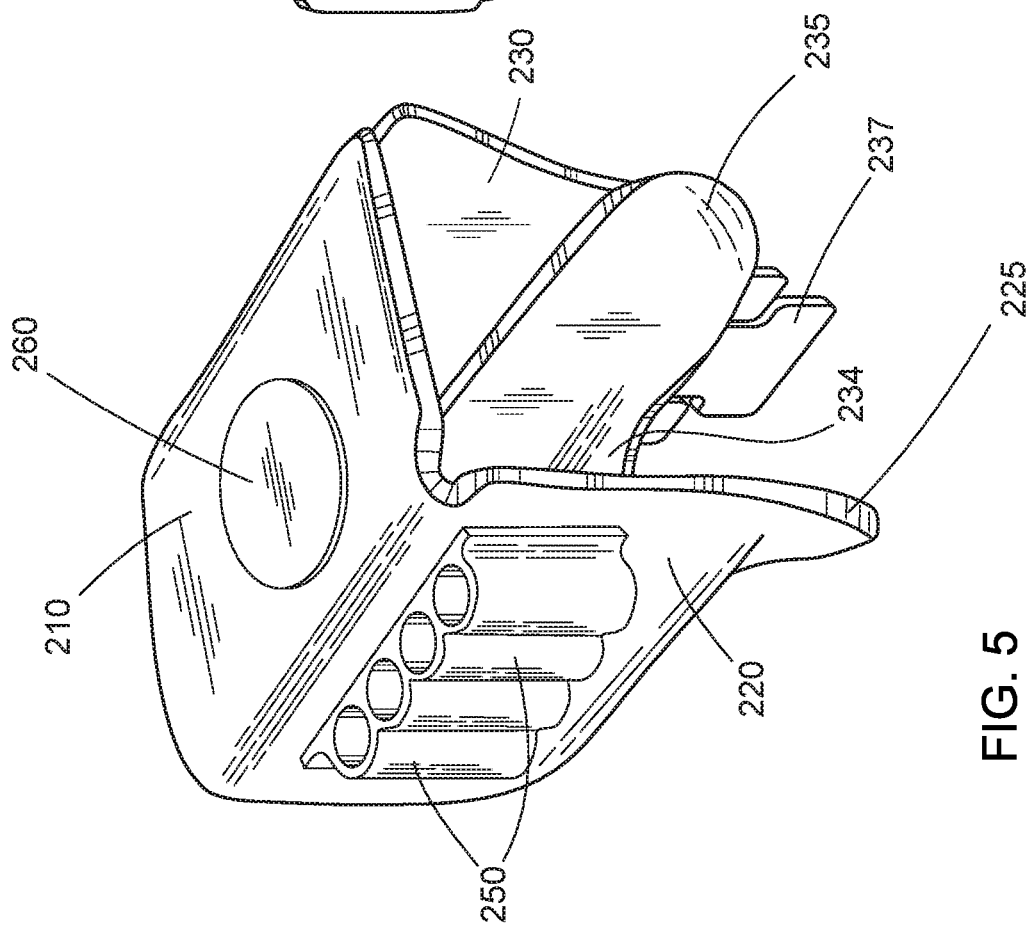
FIG. 5 illustrates schematically an alternative arrangement of the example of FIGS. 1A-1J.

To further enhance the utility of the inventive tool holder 100, in some examples the body can be arranged for enabling attachment or retention of additional small items such as tool bits or fasteners. In some examples (e.g., as in FIG. 5), the inventive tool holder 100 can include one or more pockets or sleeves attached to one or more of the central or lateral panels 210/220/230 (sleeves 250 attached to lateral panel 220 in the example shown); the pockets or sleeves can be arranged for enabling storage of one or more items on the tool holder 100, such as bits, fasteners, and so forth. In some examples (e.g., as in FIGS. 5 and 6), the inventive tool holder 100 can include one or more magnets 260 attached to or embedded within one or more of the central or lateral panels 210/220/230 (attached to the central panel 210 in the examples shown); the magnets can retain one or more magnetic metal items (e.g., bits or fasteners) against the tool holder 100 until needed by the user. Either or both of the sleeves 250 or magnet 260 can be provided on a given tool holder 100.

In addition to the preceding, the following example embodiments fall within the scope of the present disclosure or appended claims:

Example 1. A tool holder for a battery-powered tool that includes a power head, a battery-engaging portion, a handle portion connecting the power head and the battery-engaging portion, and a battery engaged with the battery-engaging portion, the tool holder comprising: (a) a body including generally parallel first and second lateral panels and a central panel that joins and spaces apart the first and second lateral panels so that the body is structurally arranged so as to enclose partly and retain the battery with the battery engaged with the tool; and (b) mounting hardware attached to one of the lateral panels and structurally arranged so as to enable attachment of the tool holder to a separate structure or object, wherein: (c) each one of the lateral panels includes a corresponding inwardly extending portion at an edge thereof opposite an edge connected to the central panel, the inwardly extending portions being structurally arranged so as to support the enclosed battery and obstruct movement of the enclosed battery out of the body in a direction generally perpendicular to the central panel; (d) the inwardly extending portions are spaced apart at a first end of the body so as to enable insertion of the battery into the body between the lateral panels with the handle portion of the tool extending away from the central panel; and (e) the tool holder is structurally arranged so as to retain and support the tool with the battery retained within the body and without any direct contact between the power head and the tool holder.

Example 2. The tool holder of Example 1 wherein the tool holder is structurally arranged so as to retain and support the tool in a generally inverted orientation with the battery held within the body, the power head positioned outside and below the body, and the handle portion extending downward away from the central panel.

Example 3. The tool holder of any one of Examples 1 or 2 wherein the tool holder is structurally arranged so as to retain and support the tool in a generally horizontal orientation with the battery held within the body, the power head positioned outside the body, and the handle portion extending generally horizontally away from the central panel.

Example 4. The tool holder of any one of Examples 1 through 3 wherein the inwardly extending portions of the lateral panels are joined together at a second end of the body opposite the first end so as to obstruct movement of the handle portion, the battery-engaging portion, or the battery of the tool past the second end of the body.

Example 5. The tool holder of any one of Examples 1 through 4 wherein the body includes an end panel connecting edges of the lateral panels at a second end of the body opposite the first end so as to obstruct movement of the battery through the body past the second end of the body.

Example 6. The tool holder of any one of Examples 1 through 5 wherein the body is arranged so as to engage only the battery.

Example 7. The tool holder of any one of Examples 1 through 5 wherein the body is arranged so as to engage the battery and the battery-engaging portion of the tool.

Example 8. The tool holder of any one of Examples 1 through 7 wherein at least portions of the lateral panels are flared outward at the first end of the body so as to guide insertion of the battery into the tool holder.

Example 9. The tool holder of any one of Examples 1 through 8 wherein the inwardly extending portions of the lateral panels are tapered toward the first end of the body so as to guide insertion of the battery into the tool holder.

Example 10. The tool holder of any one of Examples 1 through 9 wherein the central panel is flared outward at the first end of the body so as to guide insertion of the battery into the tool holder.

Example 11. The tool holder of any one of Examples 1 through 10 wherein the body is arranged so that, with the battery inserted into the body, deformation of the body urges the lateral panels toward the battery so as to frictionally engage the battery and retain the battery within the body.

Example 12. The tool holder of any one of Examples 1 through 11 wherein the body includes a detent mechanism for engaging and retaining the battery within the body.

Example 13. The tool holder of any one of Examples 1 through 12 further comprising one or more pockets or sleeves attached to one or more of the top or lateral panels, the one or more pockets or sleeves being arranged for enabling storage of one or more items on the tool holder.

Example 14. The tool holder of any one of Examples 1 through 13 further comprising one or more magnets attached to or embedded within one or more of the top or lateral panels, the one or more magnets being arranged so as to retain one or more magnetic metal items against the tool holder.

Example 15. The tool holder of any one of Examples 1 through 14 wherein the mounting hardware is structurally arranged so as to enable attachment of the tool holder to a belt, harness, vest, or shoulder strap.

Example 16. The tool holder of Example 15 further comprising the belt, harness, vest, or shoulder strap.

Example 17. The tool holder of any one of Examples 1 through 16 wherein mounting hardware is structurally arranged so as to enable attachment of the tool holder to a ladder, scaffold, tool bench, work bench, toolbox, tool bucket, or tool rack.

Example 18. The tool holder of any one of Examples 1 through 17 wherein the mounting hardware includes a mounting panel or bracket facing and attached to one of the lateral panels, wherein the mounting panel or bracket is structurally arranged so as to enable attachment of the mounting panel or bracket to, and detachment of the mounting panel or bracket from, the separate structure or object.

Example 19. The tool holder of Example 18 wherein the mounting hardware includes the mounting bracket, and the mounting bracket is structurally arranged so as to engage a mating bracket on the separate structure or object.

Example 20. The tool holder of any one of Examples 1 through 19 wherein the mounting hardware is structurally arranged so as to enable attachment of the tool holder to the separate structure or object in any one of multiple relative positions or orientations.

Example 21. The tool holder of any one of Examples 1 through 20 wherein the tool holder is arranged in a right-handed configuration wherein, with the tool holder positioned at a user's right side and with the tool in an inverted orientation, the first end of the body faces forward.

Example 22. The tool holder of any one of Examples 1 through 20 wherein the tool holder is arranged in a left-handed configuration wherein, with the tool holder positioned at a user's left side and with the tool in an inverted orientation, the first end of the body faces forward.

Example 23. A method for using the tool holder of any one of Examples 1 through 22, the method comprising, with the tool holder supported by the separate structure or object, inserting the battery into the body, with the battery passing between the lateral panels and with the handle portion extending away from the central panel, so that the tool is retained and supported by the tool holder without any direct contact between the power head and the tool holder.

Example 24. The method of Example 23 further comprising removing the tool from the tool holder by removing the battery from the body.

Example 25. The method of any one of Examples 23 or 24 wherein the tool is retained and supported in a generally inverted orientation.

Example 26. The method of any one of Examples 23 or 24 wherein the tool is retained and supported in a generally horizontal orientation.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. Similarly, "one or more of a dog or a cat" or "one or more dogs or cats" would be interpreted as including (i) one or more dogs without any cats, (ii) one or more cats without any dogs, or (iii) one or more dogs and one or more cats, unless explicitly stated otherwise or the alternatives are understood or disclosed (implicitly or explicitly) to be mutually exclusive or incompatible. Similarly, "one or more of a dog, a cat, or a mouse" or "one or more dogs, cats, or mice" would be interpreted as (i) one or more dogs without any cats or mice, (ii) one or more cats without and dogs or mice, (iii) one or more mice without any dogs or cats, (iv) one or more dogs and one or more cats without any mice, (v) one or more dogs and one or more mice without any cats, (vi) one or more cats and one or more mice without any dogs, or (vii) one or more dogs, one or more cats, and one or more mice. "Two or more of a dog, a cat, or a mouse" or "two or more dogs, cats, or mice" would be interpreted as (i) one or more dogs and one or more cats without any mice, (ii) one or more dogs and one or more mice without any cats, (iii) one or more cats and one or more mice without and dogs, or (iv) one or more dogs, one or more cats, and one or more mice; "three or more," "four or more," and so on would be analogously interpreted. For any of the preceding recitations, if any pairs or combinations of the included alternatives are understood or disclosed (implicitly or explicitly) to be incompatible or mutually exclusive, such pairs or combinations are understood to be excluded from the corresponding recitation. For purposes of the present disclosure and appended claims, the words "comprising," "including," "having," and variants thereof, wherever they appear, shall be construed as open ended terminology, with the same meaning as if a phrase such as "at least" were appended after each instance thereof, unless explicitly stated otherwise.

For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A tool holder for a battery-powered tool that includes a power head, a battery-engaging portion, a handle portion connecting the power head and the battery-engaging portion, and a battery engaged with the battery-engaging portion, the tool holder comprising:
   (a) a body including generally parallel first and second lateral panels and a central panel that joins and spaces apart the first and second lateral panels so that the body is structurally arranged so as to enclose partly and retain the battery with the battery engaged with the tool; and
   (b) mounting hardware attached to one of the lateral panels and structurally arranged so as to enable attachment of the tool holder to a separate structure or object, wherein:
   (c) each one of the lateral panels includes a corresponding inwardly extending portion at an edge thereof opposite an edge connected to the central panel, the inwardly extending portions being structurally arranged so as to support the enclosed battery and obstruct movement of the enclosed battery out of the body in a direction generally perpendicular to the central panel;
   (d) the inwardly extending portions are spaced apart at a first end of the body so as to enable insertion of the battery into the body between the lateral panels with the handle portion of the tool extending away from the central panel; and
   (e) the tool holder is structurally arranged so as to retain and support the tool with the battery retained within the body and without any direct contact between the power head and the tool holder.

2. The tool holder of claim 1 wherein the tool holder is structurally arranged so as to retain and support the tool in a generally inverted orientation with the battery held within the body, the power head positioned outside and below the body, and the handle portion extending downward away from the central panel.

3. The tool holder of claim 1 wherein the tool holder is structurally arranged so as to retain and support the tool in a generally horizontal orientation with the battery held within the body, the power head positioned outside the body, and the handle portion extending generally horizontally away from the central panel.

4. The tool holder of claim 1 wherein the inwardly extending portions of the lateral panels are joined together at a second end of the body opposite the first end so as to obstruct movement of the handle portion, the battery-engaging portion, or the battery of the tool past the second end of the body.

5. The tool holder of claim 1 wherein the body includes an end panel connecting edges of the lateral panels at a second end of the body opposite the first end so as to obstruct movement of the battery through the body past the second end of the body.

6. The tool holder of claim 1 wherein the body is arranged so as to engage only the battery.

7. The tool holder of claim 1 wherein the body is arranged so as to engage the battery and the battery-engaging portion of the tool.

8. The tool holder of claim 1 wherein at least portions of the lateral panels are flared outward at the first end of the body so as to guide insertion of the battery into the tool holder.

9. The tool holder of claim 1 wherein the inwardly extending portions of the lateral panels are tapered toward the first end of the body so as to guide insertion of the battery into the tool holder.

10. The tool holder of claim 1 wherein the central panel is flared outward at the first end of the body so as to guide insertion of the battery into the tool holder.

11. The tool holder of claim 1 wherein the body is arranged so that, with the battery inserted into the body, deformation of the body urges the lateral panels toward the battery so as to frictionally engage the battery and retain the battery within the body.

12. The tool holder of claim 1 wherein the body includes a detent mechanism for engaging and retaining the battery within the body.

13. The tool holder of claim 1 further comprising one or more pockets or sleeves attached to one or more of the top or lateral panels, the one or more pockets or sleeves being arranged for enabling storage of one or more items on the tool holder.

14. The tool holder of claim 1 further comprising one or more magnets attached to or embedded within one or more of the top or lateral panels, the one or more magnets being arranged so as to retain one or more magnetic metal items against the tool holder.

15. The tool holder of claim 1 wherein the mounting hardware is structurally arranged so as to enable attachment of the tool holder to a belt, harness, vest, or shoulder strap.

16. The tool holder of claim 15 further comprising the belt, harness, vest, or shoulder strap.

17. The tool holder of claim 1 wherein mounting hardware is structurally arranged so as to enable attachment of the tool holder to a ladder, scaffold, tool bench, work bench, toolbox, tool bucket, or tool rack.

18. The tool holder of claim 1 wherein the mounting hardware includes a mounting panel or bracket facing and attached to one of the lateral panels, wherein the mounting panel or bracket is structurally arranged so as to enable attachment of the mounting panel or bracket to, and detachment of the mounting panel or bracket from, the separate structure or object.

19. The tool holder of claim 18 wherein the mounting hardware includes the mounting bracket, and the mounting bracket is structurally arranged so as to engage a mating bracket on the separate structure or object.

20. The tool holder of claim 1 wherein the mounting hardware is structurally arranged so as to enable attachment of the tool holder to the separate structure or object in any one of multiple relative positions or orientations.

21. The tool holder of claim 1 wherein the tool holder is arranged in a right-handed configuration wherein, with the tool holder positioned at a user's right side and with the tool in an inverted orientation, the first end of the body faces forward.

22. The tool holder of claim 1 wherein the tool holder is arranged in a left-handed configuration wherein, with the tool holder positioned at a user's left side and with the tool in an inverted orientation, the first end of the body faces forward.

23. A method for using the tool holder of claim 1, the method comprising, with the tool holder supported by the separate structure or object, inserting the battery into the body, with the battery passing between the lateral panels and with the handle portion extending away from the central panel, so that the tool is retained and supported by the tool holder without any direct contact between the power head and the tool holder.

24. The method of claim 23 further comprising removing the tool from the tool holder by removing the battery from the body.

25. The method of claim 23 wherein the tool is retained and supported in a generally inverted orientation.

26. The method of claim 23 wherein the tool is retained and supported in a generally horizontal orientation.

* * * * *